US 8,049,370 B2

(12) United States Patent
Azancot et al.

(10) Patent No.: US 8,049,370 B2
(45) Date of Patent: Nov. 1, 2011

(54) CENTRALLY CONTROLLED INDUCTIVE POWER TRANSMISSION PLATFORM

(75) Inventors: Yossi Azancot, Jerusalem (IL); Amir Ben-Shalom, Modiin (IL); Oola Greenwald, Mevasseret Zion (IL); Alfred Leibovitz, Petach Tikva (IL); Arik Rofe, Jerusalem (IL)

(73) Assignee: Powermat Ltd. (IL)

( * ) Notice: Subject to any disclaimer, the term of this patent is extended or adjusted under 35 U.S.C. 154(b) by 0 days.

(21) Appl. No.: 12/731,559

(22) Filed: Mar. 25, 2010

(65) Prior Publication Data
US 2010/0219698 A1 Sep. 2, 2010

Related U.S. Application Data

(63) Continuation of application No. PCT/IL2008/001282, filed on Sep. 24, 2008.

(60) Provisional application No. 60/960,321, filed on Sep. 25, 2007, provisional application No. 60/996,191, filed on Nov. 6, 2007, provisional application No. 60/996,190, filed on Nov. 6, 2007, provisional application No. 60/996,253, filed on Nov. 8, 2007, provisional application No. 61/071,732, filed on May 14, 2008.

(51) Int. Cl.
*H01F 27/42* (2006.01)
(52) U.S. Cl. ...................................... 307/104
(58) Field of Classification Search ............ 307/104; 320/108
See application file for complete search history.

(56) References Cited

U.S. PATENT DOCUMENTS

| | | | |
|---|---|---|---|
| 3,771,085 A | 11/1973 | Hojo et al. | |
| 3,938,018 A | 2/1976 | Dahl | |
| 4,160,193 A | 7/1979 | Richmond | |
| 4,431,948 A | 2/1984 | Elder et al. | |
| 4,754,180 A | 6/1988 | Kiedrowski | |
| 4,977,515 A | 12/1990 | Rudden et al. | |
| 5,221,877 A | 6/1993 | Falk | |
| 5,229,650 A * | 7/1993 | Kita et al. | 307/66 |
| 5,278,771 A | 1/1994 | Nyenya | |
| 5,367,242 A | 11/1994 | Hulman | |
| 5,455,466 A | 10/1995 | Parks et al. | |
| 5,486,394 A | 1/1996 | Stough | |
| 5,528,113 A | 6/1996 | Boys et al. | |
| 5,550,452 A | 8/1996 | Shirai et al. | |

(Continued)

FOREIGN PATENT DOCUMENTS
EP 0160990 A2 11/1985
(Continued)

OTHER PUBLICATIONS

S.Y.R. Hui, et al., A New Generation of Universal Contactless Battery Charging Platform for Portable Consumer Electronic Equipment, IEEE Transactions on Power Electronics, vol. 20, No. 3, May 2005.

(Continued)

*Primary Examiner* — Michael Rutland Wallis
(74) *Attorney, Agent, or Firm* — Brooks Kushman P.C.

(57) ABSTRACT

An inductive power transmission platform includes a plurality of inductive power outlets connected to a common driver via individual power switches. The inductive power outlets are configured to couple with inductive power receivers to provide power to electrical loads wired thereto. The switches may be configured to remain closed while current passes therethrough. The common driver may be used to manage the power drawn by the transmission platform to each of the inductive power outlets.

15 Claims, 24 Drawing Sheets

U.S. PATENT DOCUMENTS

| | | |
|---|---|---|
| 5,600,225 A | 2/1997 | Goto |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Baarman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Hayakawa |
| 6,731,071 B2 | 5/2004 | Baarman |
| 6,766,040 B1 | 7/2004 | Catalano et al. |
| 6,803,744 B1 * | 10/2004 | Sabo ............................ 320/108 |
| 6,825,620 B2 | 11/2004 | Kuennen et al. |
| 6,888,438 B2 | 5/2005 | Hui et al. |
| 6,894,457 B2 | 5/2005 | Germagian et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,224,086 B2 | 5/2007 | Germagian et al. |
| 7,233,319 B2 | 6/2007 | Johnson et al. |
| 7,262,700 B2 * | 8/2007 | Hsu ............................ 340/572.1 |
| D553,852 S | 10/2007 | Brandenburg |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,521,890 B2 * | 4/2009 | Lee et al. ...................... 320/108 |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 7,791,311 B2 * | 9/2010 | Sagoo ............................ 320/108 |
| 7,863,859 B2 * | 1/2011 | Soar ............................ 320/108 |
| 2002/0057584 A1 | 5/2002 | Brockmann |
| 2002/0158512 A1 | 10/2002 | Mizutani et al. |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0169506 A1 | 8/2005 | Fenrich et al. |
| 2005/0192062 A1 | 9/2005 | Mickle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0279002 A1 | 12/2007 | Partovi |
| 2008/0001922 A1 | 1/2008 | Johnson et al. |
| 2008/0030985 A1 | 2/2008 | Jeon et al. |
| 2008/0049988 A1 | 2/2008 | Basile et al. |
| 2008/0067874 A1 * | 3/2008 | Tseng ............................ 307/104 |
| 2008/0079388 A1 | 4/2008 | Sarnowski et al. |
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |

FOREIGN PATENT DOCUMENTS

| | | |
|---|---|---|
| EP | 0160990 B1 | 1/1991 |
| EP | 0558316 A1 | 1/1993 |
| EP | 1990734 A1 | 11/2008 |
| GB | 2399466 A | 9/2004 |
| GB | 2399466 B | 11/2005 |
| WO | 9602879 A1 | 2/1996 |
| WO | 0215320 A1 | 2/2002 |
| WO | 0201557 A1 | 3/2002 |
| WO | 2008030985 A2 | 3/2003 |
| WO | 2006015143 A2 | 2/2006 |
| WO | 2008086080 A2 | 7/2008 |
| WO | 2008093334 A2 | 7/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010/025156 A1 | 3/2010 |
| WO | 2010/025157 A1 | 3/2010 |

OTHER PUBLICATIONS

X Liu, et al., An Analysis of a Double-layer Electromagnetic Shield for a Universal Contactless Battery Charging Platform, IEEE 2006.

X Liu, Equivalent Circuit Modeling of a Multilayer Planar Winding Array Structure for Use in a Universal Contactless Battery Charging Platform, 2006 IEEE.

S.C. Tang, et al., Evaluation of the Shielding Effects on Printed-Circuit-Board Transformers Using Ferrite Plates and Copper Sheets, 2002 IEEE.

Y.P. Xu, et al., Extended Theory on the Inductance Calculation of Planar Spiral Windings Including the Effect of Double-layer Electromagnetic Shield, 2007 IEEE.

Xun Liu, et al., Optimal Design of a Hybrid Winding Structure for Planar Contactless Battery Charging Platform, 2007 IEEE.

Xun Liu, et al., Simulation Study and Experimental Verification of a Universal Contactless Battery Charging Platform With Localized Charging Features, 2007 IEEE.

International Search Report and Written Opinion as filed in PCT/IL2008/001282, as mailed on Mar. 3, 2009.

International Search Report and Written Opinion as filed in PCT/IL2008001347, as mailed on Feb. 17, 2009.

International Search Report and Written Opinion as filed in PCT/IL2008/001348, as mailed on Oct. 12, 2008.

* cited by examiner embed in a surface a cluster comprising a plurality of primary inductive coils each connected to a power switch, said power switch being configured to remain closed for as long as electric current passes therethrough – step (alpha)

connect all power switches to a common driver, said driver for providing an oscillating voltage to said cluster only if it receives an activation signal – step (beta)

provide a inductive power receiver comprising a secondary inductive coil wired to an electric load and at least one trigger configured to close at least one said power switch when said secondary inductive coil is aligned with the primary inductive coil associated therewith – step (gamma)

provide a secondary detector configured to send said activation signal to said driver when it detects a secondary inductive coil coupled to said primary inductive coil – step (delta).

Fig. 13

CENTRALLY CONTROLLED INDUCTIVE POWER TRANSMISSION PLATFORM

CROSS-REFERENCE TO RELATED APPLICATIONS

This application is a continuation of PCT application Serial No. PCT/IL2008/001282 filed Sep. 24, 2008, which claims the benefit of U.S. provisional application Ser. Nos. 60/960,321 filed Sep. 25, 2007; 60/996,191 filed Nov. 6, 2007; 60/996,190 filed Nov. 6, 2007; 60/996,253 filed Nov. 8, 2007 and 61/071,732 filed May 14, 2008, which are hereby incorporated by reference in their entirety.

TECHNICAL FIELD

The disclosure relates to systems and methods for controlling inductive power transmission.

BACKGROUND

Inductive power coupling allows energy to be transferred from a power supply to an electric load without connecting wires. A power supply is wired to a primary coil and an oscillating electric potential is applied across the primary coil which induces an oscillating magnetic field. The oscillating magnetic field may induce an oscillating electrical current in a secondary coil, placed close to the primary coil. In this way, electrical energy may be transmitted from the primary coil to the secondary coil by electromagnetic induction without the two coils being conductively connected. When electrical energy is transferred from a primary coil to a secondary coil the pair are said to be inductively coupled. An electric load wired across such a secondary coil may draw energy from the power source when the secondary coil is inductively coupled to the primary coil.

The efficiency of energy transfer via an inductive coupling is greatly improved when the primary coil is well aligned with the secondary coil and the gap between the coils is minimal. Thus in transformers or other fixed inductive couplings the two coils are often wound about each other. This is not practical, however in systems where the coupling is of a temporary nature, and the secondary coil is required to be easily separated from the primary coil.

Alignment systems for inductive couplings for mobile devices include for example, the system described in U.S. Pat. No. 7,210,940 to Baily et al., which describes an inductive coupling for transferring electrical energy to or from a transducer and measuring circuit. Baily's system consists of a male connector having a single layer solenoid wound onto a ferromagnetic rod and a female connector having a second, single layer solenoid. By inserting the male connector into the female connector, the two solenoids are brought into alignment, enabling inductive energy transfer between them. This coupling provides a sealed signal connection without the disadvantages of having exposed contact surfaces.

Baily's system allows an electrical device wired to a male connector to be moved independently from a power source wired to a female connector, yet the pair may be coupled very precisely by plugging the two together. However the plugging itself may unduly restrict the freedom of movement of the electrical device which cannot move beyond the length of the connecting lead. Moreover, trailing leads are unsightly and may become snagged or tangled.

Other electrical power transmission systems have been proposed that allow a power receiving electrical device to be placed anywhere upon an extended base unit covering a larger area, thereby providing freedom of movement without requiring the trailing wires inherent in Baily. One such example is described in U.S. Pat. No. 7,164,255 to Hui. In Hui's system a planar inductive battery charging system is designed to enable electronic devices to be recharged. The system includes a planar charging module having a charging surface on which a device to be recharged is placed. Within the charging module, and parallel to the charging surface, is at least one, and in one embodiment an array of primary windings that couple energy inductively to a secondary winding within the device to be recharged. Hui's system also provides secondary modules that allow the system to be used with conventional electronic devices not supplied with secondary windings.

Such systems typically provide a relatively low power inductive coupling which may be adequate for charging batteries. It will be appreciated however, that extended base units such as Hui's charging surface which transmit energy approximately uniformly over the whole area of the unit, are not suitable for use with high energy systems.

There is a need for a flexible inductive power transmission surface which allows relatively high power to be cordlessly provided to electrical devices positioned by a user anywhere over an extended region. The present disclosure addresses this need.

SUMMARY

It is one aim of the disclosure to provide a power module for providing power inductively to at least one electrical load, the power module comprising at least one primary inductor, for inductively coupling with at least one secondary inductor wired to the electrical load, wherein the location of the primary inductor is adjustable.

Optionally, the power module comprises a base unit having at least one power dock for accommodating at least one primary inductor unit. The power dock may comprise at least one of: a socket for releasably receiving the primary inductor unit and a clip for releasably securing the primary inductor unit. The primary inductor unit may comprise at least one electrical contact for connecting the primary inductor unit to a power line for providing power to the primary inductor. The power line may comprise a signal line for communicating between a controller and the primary inductor unit. Typically, the power line comprises a three core cable. In some embodiments, primary inductor units are connected in parallel to the at least one power line. Optionally, a plurality of the primary inductor units are each connected to at least one power hub, the power hub for controlling power distribution to the primary inductor units.

In some embodiments the power module comprises at least one connector for coupling the module to at least one further module. In one embodiment, the connector comprises at least one mechanical connector for mechanically coupling the module to a further module. Additionally, the connector may comprise at least one electrical contact for electrically coupling the module to a second module. Typically the module further comprises a lid for covering the power docks and thereby providing a generally smooth worktop.

Typically, the module has a tessellating shape for tiling a work surface. The tessellating shape may be selected from the group comprising inter alia: quadrilaterals, triangles, hexagons and square based pentagons. In other embodiments, the module is incorporated into a horizontal platform. The horizontal platform may be selected from the group comprising, inter alia: table-tops, kitchen work-tops, conference tables, work benches, desks and floors. In still further embodiments the module may be incorporated into the floors, ceilings or walls of a workspace.

Alternatively, the module comprises at least one flexible strip capable of assuming a plurality of configurations within at least one plane, such that the power dock is movable into the vicinity of the secondary inductor. In some embodiments the flexible strip comprises a ridged rim. Alternatively, the flexible strip comprises a plurality of jointed sections. Optionally, the flexible strip being closed into a band. In various embodiments the module comprises a flexible material selected from the group comprising elastomers, woven fabric, unwoven fabrics and polymers.

According to another aspect of the disclosure, a primary inductor unit is presented for coupling with a secondary inductor unit wired to an electrical device, the primary inductor unit being connectable to at least one power dock of base unit.

It is a further aim of the disclosure to present a power module comprising a plurality of the primary inductors and a common driver, the driver for providing an oscillating voltage to the primary inductors, wherein the primary inductors are connected to the common driver via individual power switches. In one embodiment, each of the power switches remains closed for as long as electric current passes therethrough. Typically, the power switch comprises a reed switch and a solenoid for providing a magnetic field in the vicinity of the reed switch when the reed switch is closed.

In various embodiments, the power module additionally comprises a secondary sensing unit, in communication with the driver, for detecting the secondary inductor coupled to the primary inductor. Optionally the sensing unit comprises an optical receiver for receiving an optical signal from an optical emitter associated with the secondary inductor.

It is still a further aim of the disclosure to provide an energy management system for managing the power drawn by a power board from a power source, the power board comprising a plurality of electrical power jacks, wherein the energy management system comprises:

at least one power monitor for monitoring the power drawn by the power board and for producing a power signal;

at least one load detector for detecting the presence of at least one load coupled with at least one power jack of the power board and producing a detection signal; and at least one controller for receiving the power signal from the power monitor and the detection signal from the load detector, selecting at least one power jack to be activated and controlling power delivered to the at least one power jack.

Optionally the energy management system additionally comprises at least one energy reservoir.

Typically the energy reservoir is couplable to at least one of the group comprising the power source and at least one the power jack.

A reservoir monitor may be provided for monitoring the level of energy stored in the energy reservoir producing a reservoir signal such that the controller receives the reservoir signal and selectively couples the energy reservoir to the power source.

Typically the energy reservoir is selected from at least one of the group comprising a voltaic cell, a capacitor, a fuel cell, a supercapicitor, a flow battery and a superconducting magnetic energy store.

In one embodiment, at least one load is a computer having onboard rechargeable power cells and the energy reservoir being the power cells. Typically software is provided for reducing screen brightness of the computer by at least one degree.

Typically the power board comprises an array of inductive power jacks for inductive coupling to inductive power plugs.

Optionally the load detector is selected from the group comprising a volume sensor, an infra-red sensor, an ultrasonic sensor, a hall probe, a spring switch, a magnetic switch, a transmitter-receiver arrangement and inductive coils.

Typically the controller is configured to connect a plurality of the loads to the power source sequentially.

A further object of the disclosure is to introduce a method for aligning a primary inductor wired to a power source, to a secondary inductor wired to an electric load, the method comprising the steps of:

providing at least one adjustable power supply module comprising said primary inductor;

providing at least one secondary inductor;

adjusting the configuration of said adjustable module such that said primary inductor is proximal said secondary inductor; and aligning said secondary inductor to said primary inductor.

Optionally, the method comprises the additional step of coupling together a plurality of said modules such that said primary inductor may be selectively positioned in a plurality of locations.

Where the adjustable module comprises a plurality of power docks for accommodating said primary inductor, a further step comprises docking said primary inductor into at least one said power dock. Where the adjustable module has a plurality of configurations, a further step comprises selecting a configuration wherein said primary inductor is in the vicinity of said secondary inductor.

Another aim of the disclosure is to introduce a method for providing low maintenance inductive power transmission by:

embedding in a module a cluster comprising a plurality of primary inductors each said primary inductor connected to a power switch, said power switch being configured to remain closed for as long as electric current passes therethrough;

connecting all power switches to a common driver, said driver for providing an oscillating voltage to said cluster only if it receives an activation signal;

providing a inductive power receiver comprising a secondary inductor wired to an electric load and at least one trigger configured to close at least one said power switch when said secondary inductor is aligned with the primary inductor associated therewith, and providing a secondary detector configured to send said activation signal to said driver when it detects a secondary inductor coupled to said primary inductor.

Yet another object of the disclosure is to introduce a method for managing the power drawn from a power source by a power board, the power board comprising a plurality of electrical power jacks, the method comprising the steps:

providing at least one power monitor;

providing at least one load detector;

providing at least one controller;

monitoring the power drawn by the power board and producing a power signal;

detecting at least one load coupled with at least one power jack of the power board and producing a detection signal;

the controller receiving the power signal and the detection signal;

the controller selecting at least one power jack to be activated;

the controller determining a duty cycle for connecting active power jacks; and
connecting the active power jacks according to the duty cycle.

Typically the duty cycle connects active power jacks individually and sequentially.

Alternatively the duty cycle connects at least two active power jacks simultaneously.

Optionally the power drawn by the power board is limited to a range of values. The range may be selected around the peak efficiency power of the system.

The method may include providing at least one energy reservoir couplable to at least one of the group comprising the power source and at least one the power jack.

The energy reservoir may be connected to at least one activated power jack when the activated power jack is disconnected from the power source.

BRIEF DESCRIPTION OF THE FIGURES

For a better understanding of the disclosure and to show how it may be carried into effect, reference will now be made, purely by way of example, to the accompanying drawings.

With specific reference now to the drawings in detail, it is stressed that the particulars shown are by way of example and for purposes of illustrative discussion of representative embodiments of the present disclosure only, and are presented in the cause of providing what is believed to be the most useful and readily understood description of the principles and conceptual aspects of the disclosure. In this regard, no attempt is made to show structural details of the disclosure in more detail than is necessary for a fundamental understanding of the disclosure; the description taken with the drawings making apparent to those skilled in the art how the several forms of the disclosure may be embodied in practice. In the accompanying drawings:

FIG. 11a shows the inductive power outlet in its inactive configuration;

FIG. 11b shows the inductive power outlet activated to transfer power to a secondary unit inductively coupled thereto;

FIG. 11c shows the inductive power outlet following the removal of the secondary unit;

FIG. 13 is a flowchart illustrating a method for activating and deactivating an inductive power outlet using a protected switch system.

DETAILED DESCRIPTION

Figure 1:
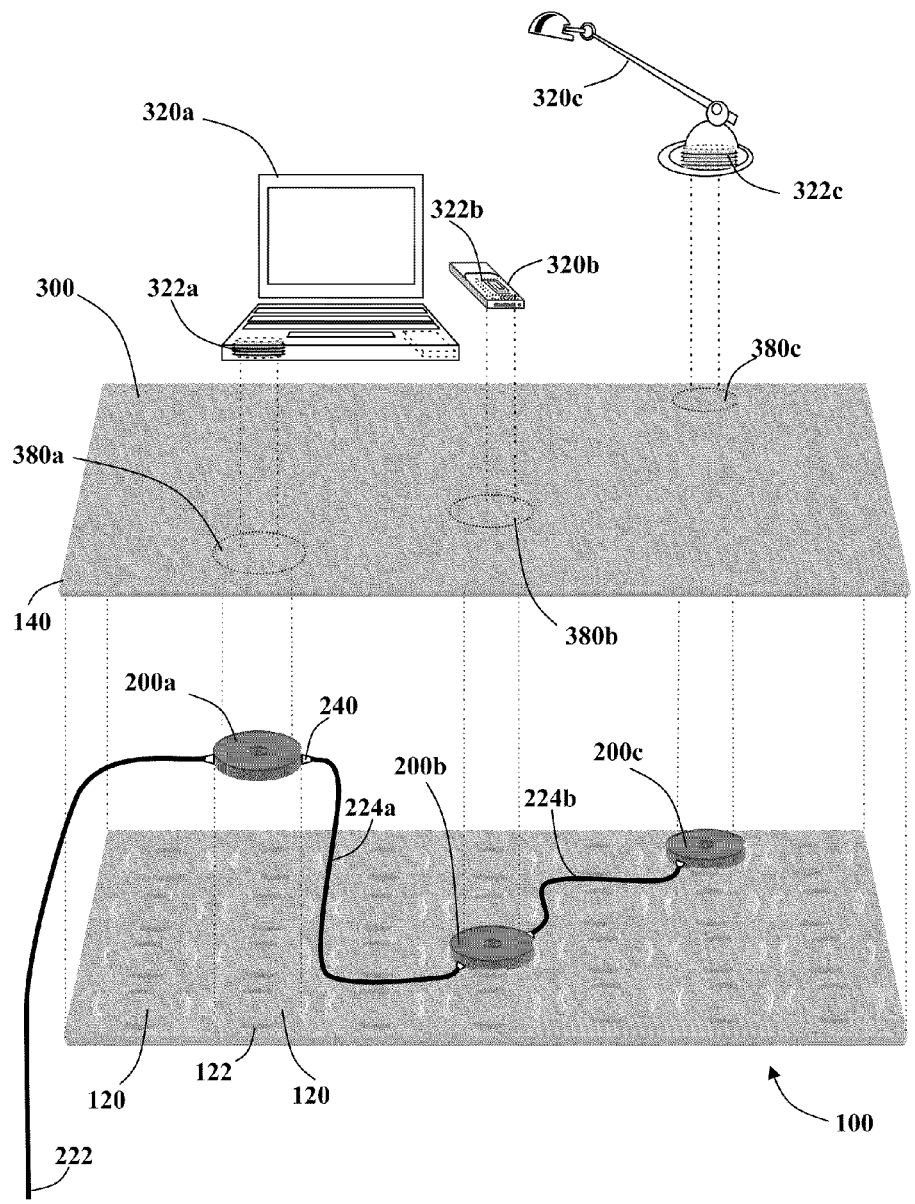
FIG. 1 is an exploded schematic representation of a power transmission platform with electrical devices thereupon according to one embodiment of the disclosure.

Referring to FIG. 1, the present disclosure relates to an inductive power transmission platform 100 for accommodating a plurality of primary inductor units 200a, 200b, 200c. The inductive power transmission surface 100 may be incorporated, for example, into a table top for powering or charging electrical devices 320, such as, inter alia, a laptop computer 320a, a mobile phone 320b and a standing lamp 320c, placed thereupon.

The transmission platform 100 includes a plurality of power docks 120, into which the primary inductor units 200 are affixable. For high density coverage, the power docks 120 may be arranged in a rectangular or staggered hexagonal (honeycomb) array.

It is a particular feature of some embodiments of the current disclosure that primary inductor units 200a, 200b, 200c may be positioned in any of the docks, and thus the arrangement of primary inductor units 200 may be varied to meet specific needs, perhaps on a custom basis.

Electrical devices 320, such as a computer 320a, mobile telephone 320b or a desk lamp 320c, for example, may be provided with secondary inductors 322 for coupling with the primary inductor units 200 to draw power therefrom.

Each primary inductor units 200 may be secured into place at a dock 120 by a fastening means 122 such as clips arranged around the dock 120. The primary inductive coil unit 200 may be snap-fitted into a dock 120 by pushing it manually into position, and released therefrom by pulling. It will be apparent that other securing means such as clasps, sockets and the like may alternatively perform the function illustrated here by the clips 122.

The primary inductor units 200 are connected to a power source by a supply power line 222. Short-length connecting power lines 224a, 224b may be used to connect a chain of primary inductor units 200 together. The power lines 222, 224 may be electrically coupled to the primary inductor units 200 via connecting plugs 240. Power lines 222, 224, typically include two power cores 221a and 221b (FIG. 2) for providing the varying potential used to power the primary inductor units 200 as well as a signal line 223 for providing a communications channel between a controller (not shown) and the primary inductor units 200 for controlling the power distribution. It will be appreciated that various connection configurations may be more amenable to certain applications such as hub configurations or the like as described below.

Typically the power platform 100 is covered by a lid 140, providing a generally smooth worktop 300. By aligning the secondary inductors 322 with primary inductor units 200 situated at access points 380a-c below the smooth worktop 300, power may be transferred to the associated electrical devices 320.

By way of example, only, the inductive platform 100 described hereinabove is a module adapted to be placed onto a desk-top. It is noted, however, that primary inductor units 200 may be usefully affixed to or within other work surfaces such as within a desk-top, a kitchen work-top, a conference table, a work bench, as an under-floor arrangement or the like, which may optionally be covered to produce a generally smooth working area. Indeed in other embodiments of the disclosure, primary inductor units 100 may be embedded into non-horizontal surfaces such as the walls of a room, a ceiling, or the side of a cabinet for example.

Although, inductive power transferred from a suitable primary inductor unit 100 may used for recharging a mobile phone 320b, as previously described in systems such as that described in U.S. Pat. No. 7,164,255 to Hui, referenced hereinabove, it is a particular feature of embodiments of the disclosure, that because the power may be supplied at specific (albeit user configurable) locations within the surface, and not generally simultaneously all over an extended surface, high power, even that sufficient for directly powering a computer 320a, a desk lamp 320c or the like, may be inductively provided where needed.

Figure 2:
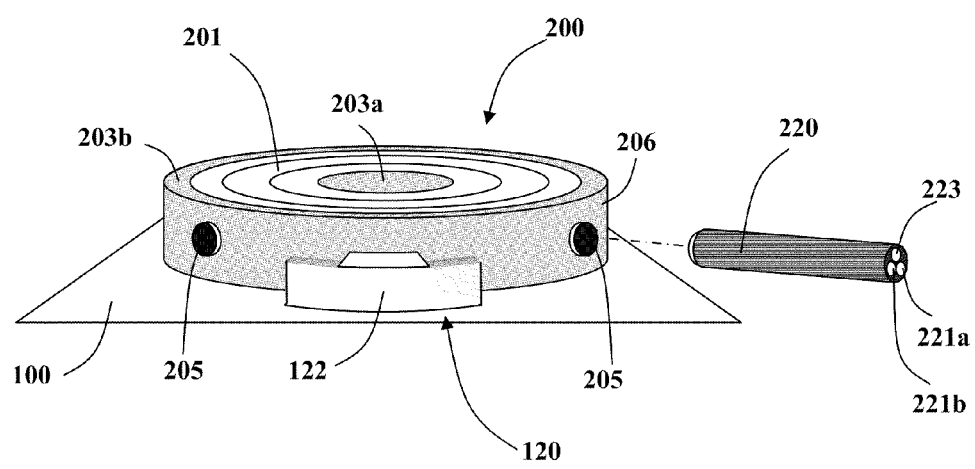
FIG. 2 is a schematic representation of a primary inductor unit for use with the power transmission platform.

One embodiment of a primary inductor unit 200 is represented in FIG. 2. A coil 201 of conductive material is nested between a central shaft 203a and an encompassing ring 203b of a ferromagnetic flux guiding core 203, such as a ferrite material. A contact socket 205 on the outer surface 206 of the primary inductor unit 200 is configured to receive the connecting plug 240 of a power line 220. The power line 220 is typically a three core cable having two power cores 221a and 221b as well as a signal line 223. The primary inductor unit 200 is secured to the power transmission surface 100 by being pushed into the power dock 120 where it may be fastened into place by a clip 122 or the like.

In contradistinction to prior art systems, in various embodiments of the current disclosure the primary inductor units 200 are movable within or over the surface to which they are attached or else removable therefrom. It will be apparent, therefore that the arrangement of the primary inductor units 200 may be configured and reconfigured, thereby allowing the transmission surface 300 to be customized to suit various and perhaps changing needs.

Figure 3A:
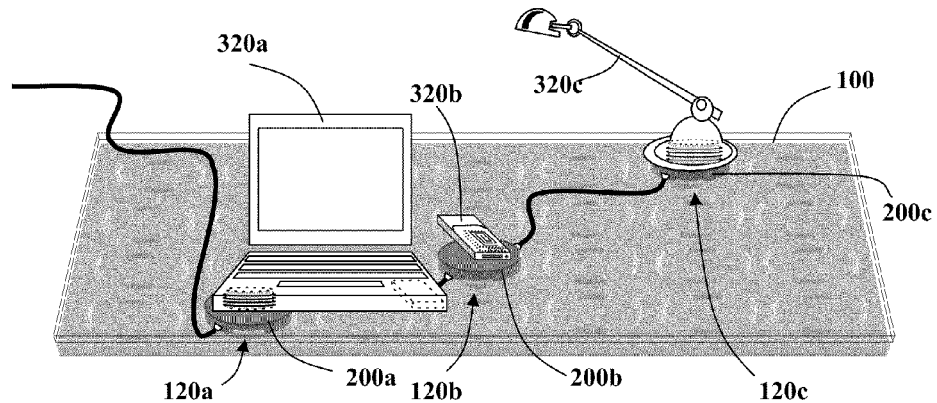
FIGS. 3a and 3b are schematic representations showing two alternative configurations of the power transmission platform.
Figure 3B:
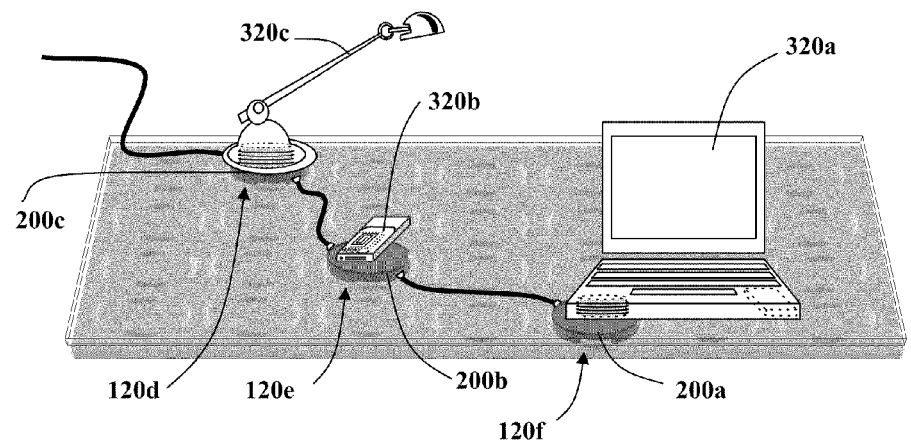

With reference to FIGS. 3a and 3b, the same power transmission platform 100 is shown in two alternative configurations.

With particular reference to FIG. 3a, three primary inductor units 202, 204, 206 are connected to three separate power docks 120a, 120b, 120c respectively. Primary inductor units 200a-c may be suited for particular devices, so, for example a low power primary inductor unit 200b may be optimized to recharge a mobile phone 320b whereas a high power primary inductor 200a may be optimized to power a computer 320a and a medium power primary inductor 200c may be optimized to power a desk lamp 320c for example.

By way of example only, a right handed user may choose to customize the primary inductor units 200a, 200b ergonomically so that the mobile phone 320b may be placed to the right of the computer 320a, say, where it may be easily reached. However, a left handed user may desire to reconfigure the power transmission platform 100, as shown in FIG. 3b, so that the lamp 320c and the mobile telephone 320b are situated to the left of the computer 320a. Such a reconfiguration may be achieved by rearranging the primary inductor units 200 on the power transmission platform 100, connecting them to other power docks 120d, 120e, 120f, located more conveniently for the requirements of the new configuration.

Figure 4A:
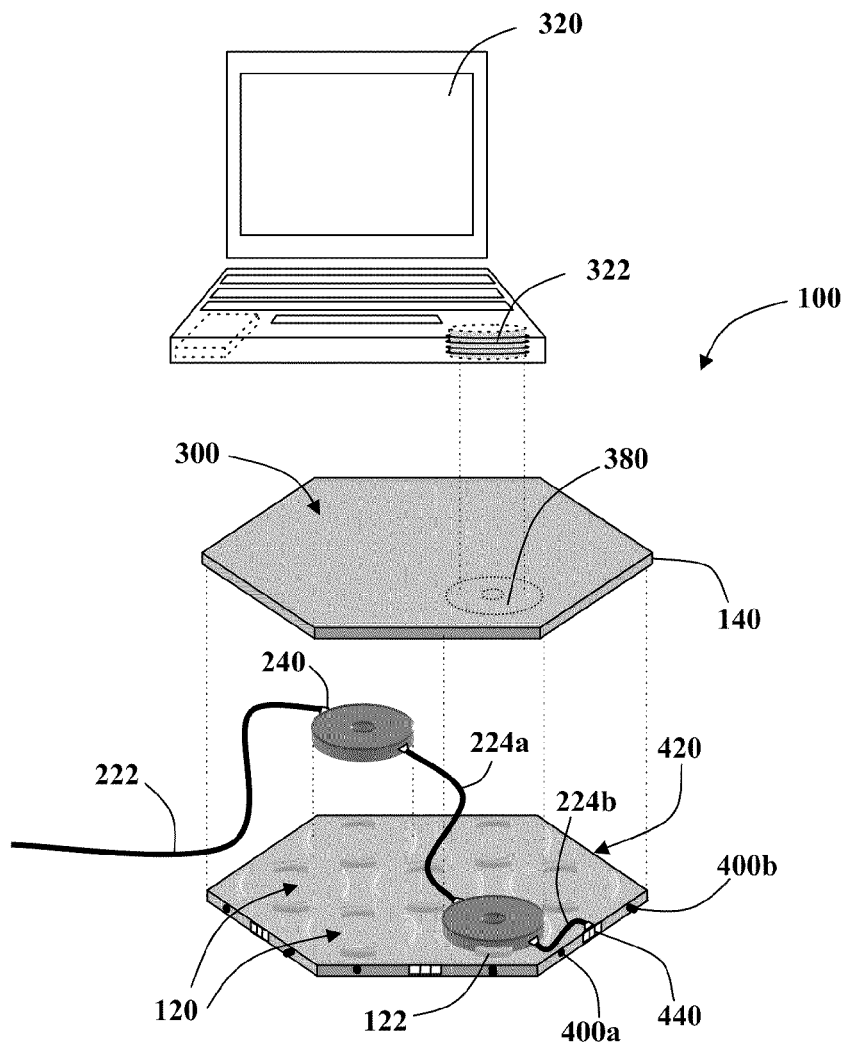
FIGS. 4a and 4b are schematic representations of a modular power transmission platform according to another embodiment of the disclosure.
Figure 4B:
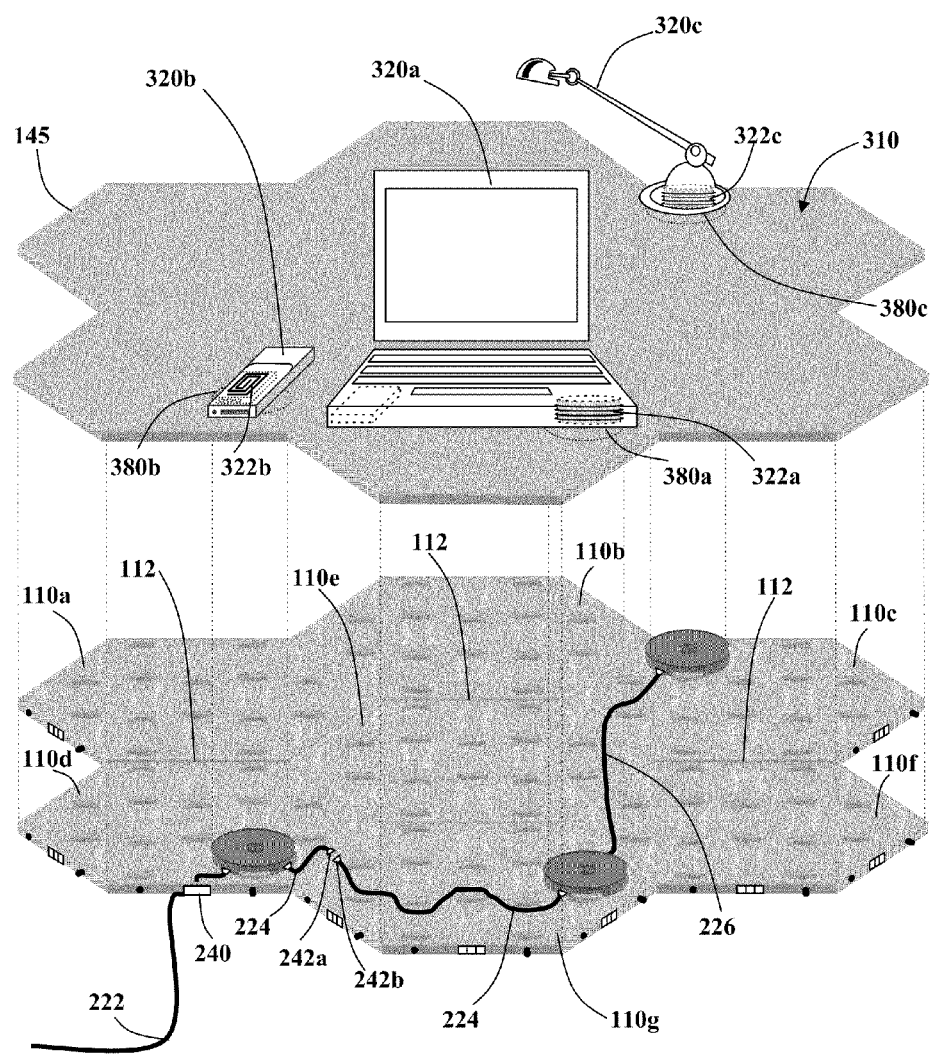

Reference is now made to FIGS. 4a and 4b, showing a modular power platform 110 according to another embodiment of the disclosure. Where the area of the required work surface is greater than the area of the individual module 110 more than one module may be coupled together to form a larger transmission surface 310. Mechanical connectors 400, such as clips, hook-and-eye connectors, magnets and the like, may be provided around the perimeter 420 of the module for releasably attaching two modules 110 mechanically. Electrical contacts 440 may also be used to provide electrical communication between the power lines 224 of adjacent modules 110.

Referring particularly to FIG. 4b, module tiles 110a-g may be coupled together both electrically and mechanically. Connectors 242 may be used to electrically connect power lines 224 within each tile 110 to electrical contacts 440 on the tile perimeter, alternatively longer power lines 226 may be used to directly couple individual primary coil units. A horizontal transmission surface 310 is thereby provided upon which electrical devices 320 may be placed. Electrical devices 320, such as a computer 320a, mobile telephone 320b or a desk lamp 320c, for example, may be provided with secondary inductive coils 322 for coupling with the primary coils 200 embedded within transmission surface 310. Power may be transferred to the electrical devices 320 by aligning the secondary inductive coils 322 associated with the electrical devices 320 with access points 380a-c upon the transmission surface 310 at which the primary coils 200 are located.

Although only hexagonal tiles 110 are described hereinabove, it will be apparent that any tessellating shape may be used to produce a power transmission surface 310. Tiles of any tessellating shape may be used, such as quadrilaterals, triangles, square based pentagons, hexagons, etc. Alternatively, tiles may be produced in complementary tessellating pairs, such as octagons and squares for example, so as to provide semi-regular tessellations, or an octagonal array with spaces therewithin may be provided.

Optionally, an extended cover 145 may be provided for covering a plurality of tiles 110, as well as the seams 112 between adjacent tiles 110. In this way a generally smooth transmission surface 310 may be provided suitable for a variety of applications.

Figure 6A:
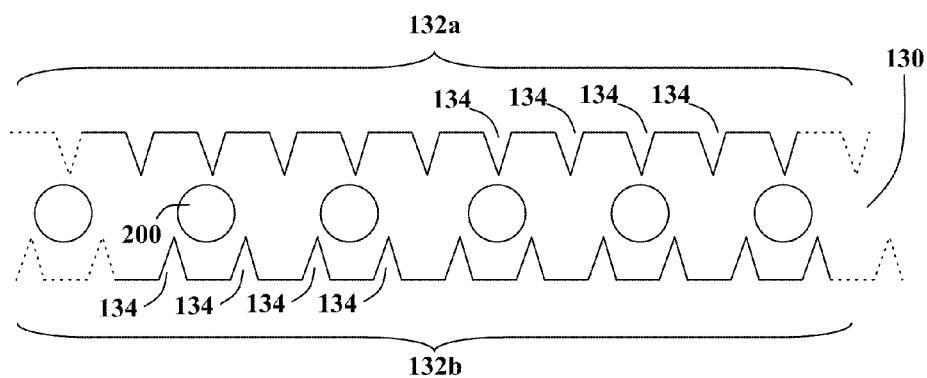
FIGS. 6a and 6b are schematic representations showing one specific embodiment of a band used to provide flexibility for the flexible power strip.
Figure 6B:
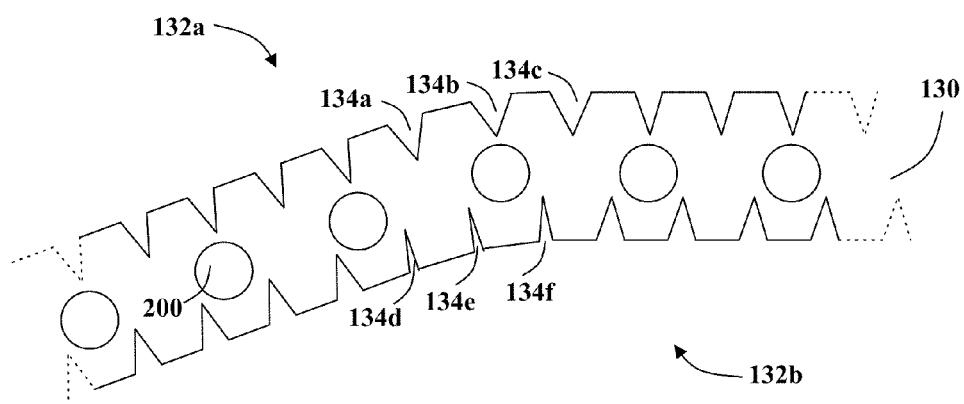

Still another embodiment of the disclosure is shown in FIGS. 6a and 6b. Referring particularly to FIG. 6a, a flexible base unit is configured as a strip 102 for inductively providing power to a plurality of electrical devices such as a laptop computer 520. Primary inductor units 200a-h are incorporated within a band 130 for inductively coupling with secondary inductors wired to the electrical devices. It is a particular feature of this embodiment of the present disclosure that the configuration of the band 130 may be adjusted to suit a plurality of needs.

By way of example, the usefulness of the flexible power strip 102 may be illustrated by considering the following situation. One power strip 102 may be closed into a band and overlaid upon a conference table 302 and used to power four laptop computers 520a-d, each perhaps used by a different participant at a meeting. Each computer 520 has a secondary coil unit 322 associated therewith. The secondary coil units 322 may be external units 324 coupled to a computer by a connecting lead 326, alternatively computers and the like may include hardwired integral secondary coils. A first configuration $C_1$ of the power strip 102 may be selected such that there is at least one primary coil unit 200a-d within reach of each computer 520a-d. A fifth participant may subsequently join the meeting bringing a fifth laptop 520e computer, as shown in FIG. 5b. Because the first configuration $C_1$ was selected to best suit the needs of four computers 520a-d, there may be no primary coil unit 200 within reach of the extra computer 520e. The inherent flexibility of the power strip 102 allows it to be adjusted into a second configuration $C_2$ in which an extra primary coil unit 200e is brought into the vicinity of the extra computer 520e.

Figure 5A:
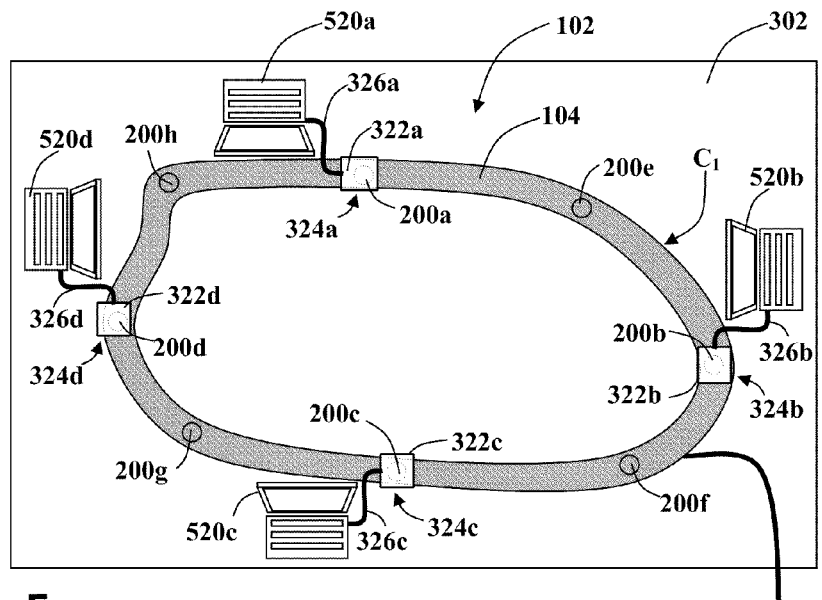
FIGS. 5a and 5b are schematic representations showing two alternative configurations of a flexible power strip in accordance with a further embodiment of the disclosure.
Figure 5B:
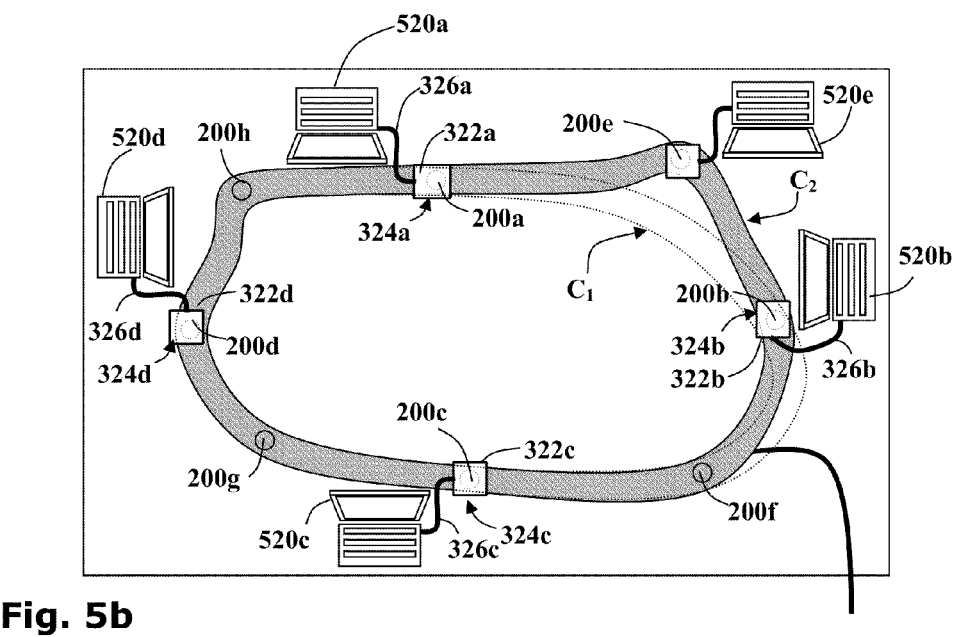

In addition to a conference table 300 as shown in FIGS. 5a and 5b, it will be appreciated that flexible power strips 102 of embodiments of the disclosure may be placed on or incorporated within other work surfaces including desk-tops, kitchen work-tops, work benches, floors and the like. Indeed, the flexible strip 102 may also be vertically mounted on a wall for example.

An exemplary flexible band 130 is shown in FIGS. 6a and 6b. A flexible material is provided with ridged edges 132. The flexible material may be inter alia an elastomer such as rubber, butadiene, neopropene or the like, a woven fabric, an unwoven fabric such as felt or the like. The flexible band 130 may be arranged in a straight configuration as shown in FIG. 6a in which the ridges 134 are all of the same dimensions. Alternatively, the band 130 may be bent to provide a curved configuration as shown in FIG. 6b wherein ridges 134a-c long the outer edge 132a are wider than the ridges 134d-f along the inner edge 132b.

Alternative flexible strips or bands may include jointed sections, articulated frames or the like, which may be bent in at least one plane to provide a plurality of configurations of the band 130.

Figure 7A:
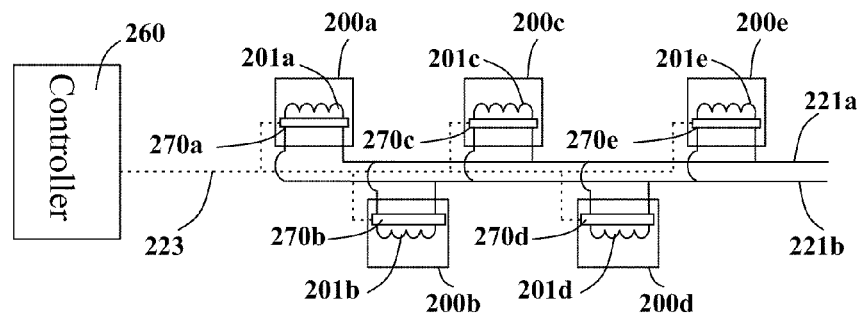
FIG. 7a-d show multiple primary inductor units arranged in a daisy-chain configuration according to various embodiments of the disclosure.
Figure 7B:
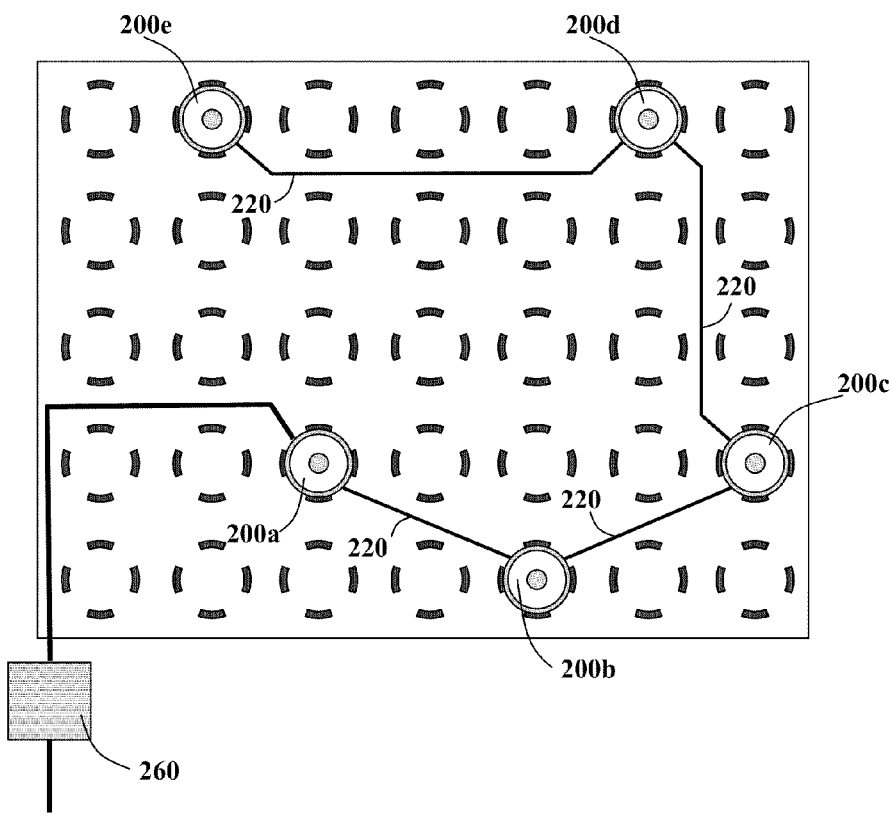
Figure 7C:
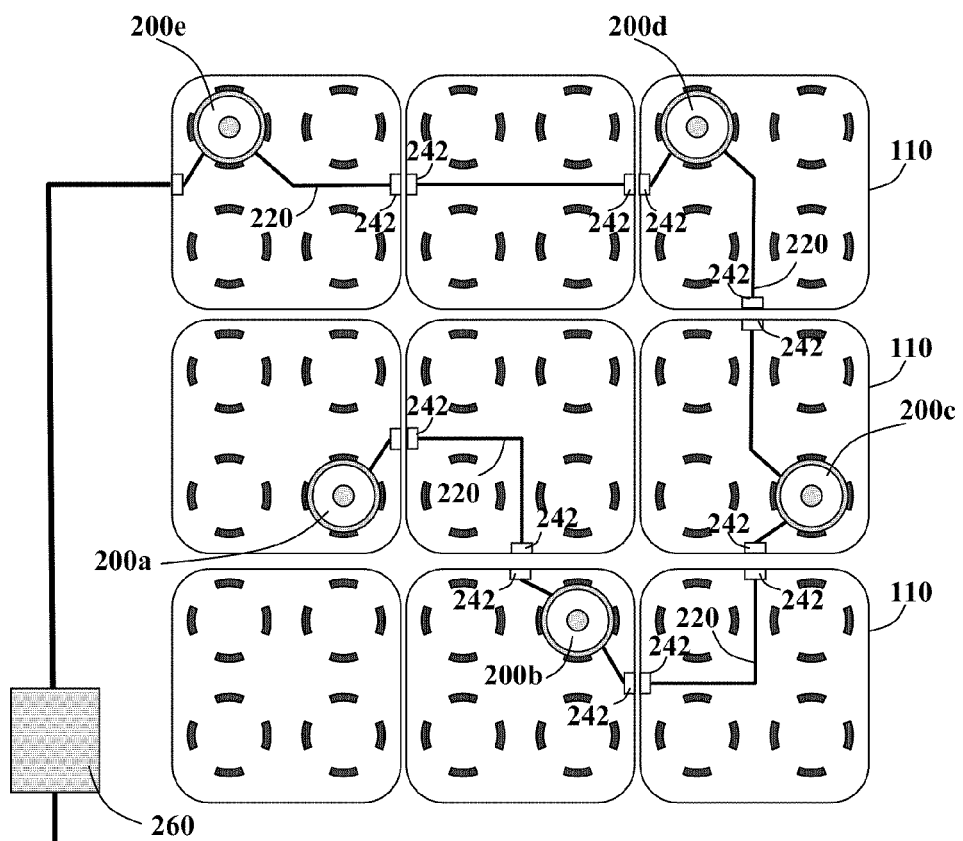
Figure 7D:
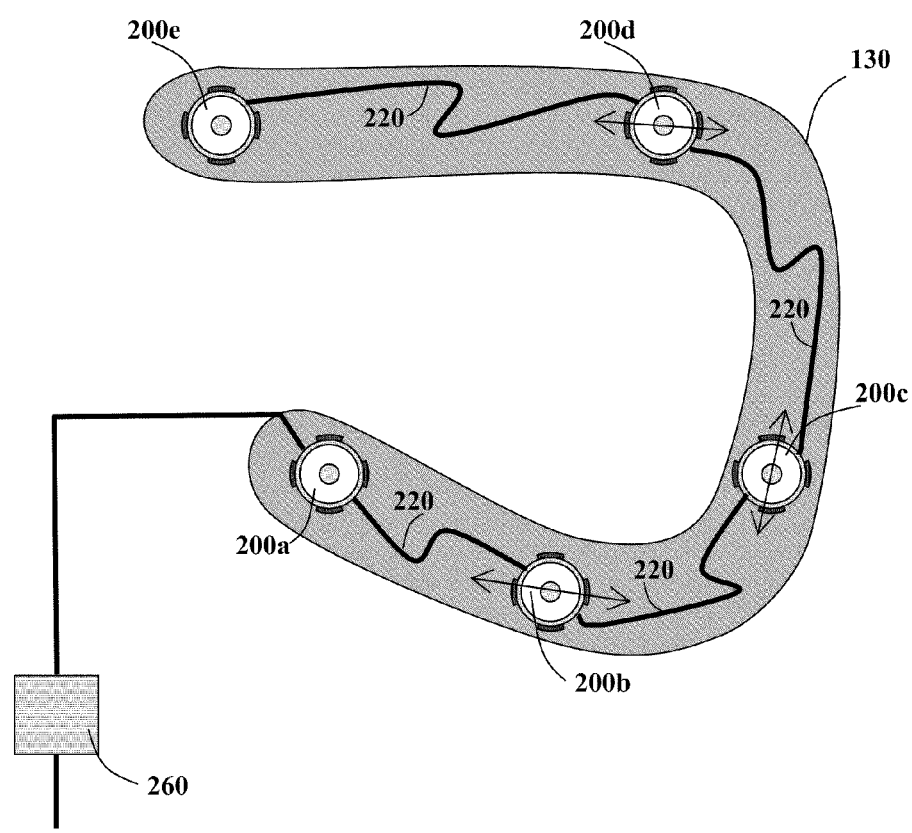

Referring to FIG. 7a, primary inductor units 200a-e may be arranged in a daisy-chain configuration controlled by a controller 260 wired to a power source. The primary inductor units 200 are connected by connecting power lines 220 which conductively connect the primary coils 201 to the power source via switching units 270a-e. The switching units 270a-e are in communication with the controller 260 via a signal line 223 and are configured and operable to activate the primary coils 201 when they receive a signal. FIG. 7b shows how the daisy-chain configuration may be incorporated into a power platform. Similarly, the daisy-chain configuration may be incorporated into other embodiments of the disclosure such as the modular power platform or flexible power platform as shown in FIG. 7c and FIG. 7d respectively.

Figure 8A:
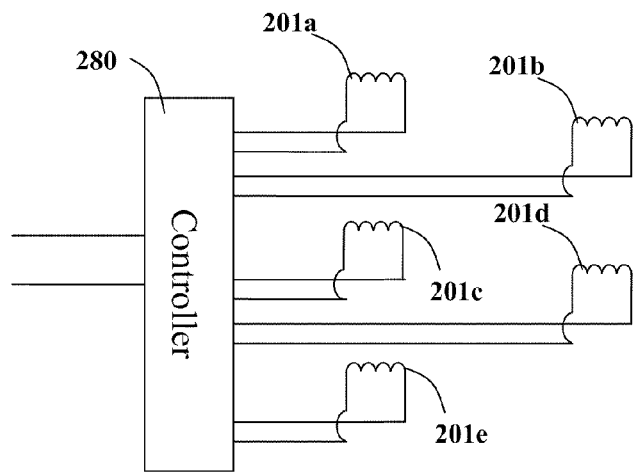
FIG. 8a-c show multiple primary inductor units arranged in a hub configuration according to various embodiments of the disclosure.
Figure 8B:
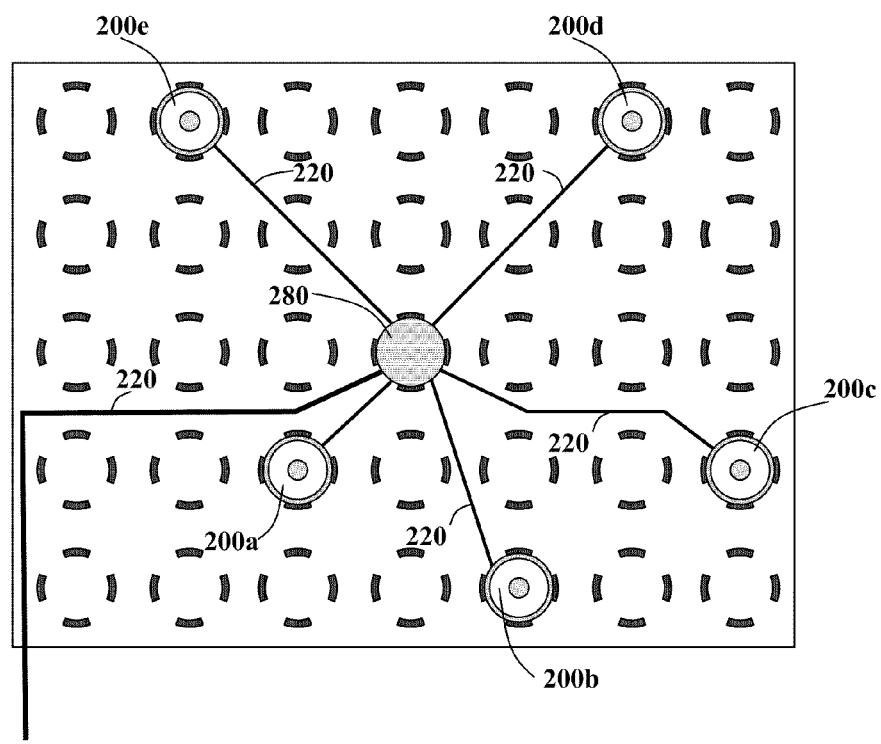
Figure 8C:
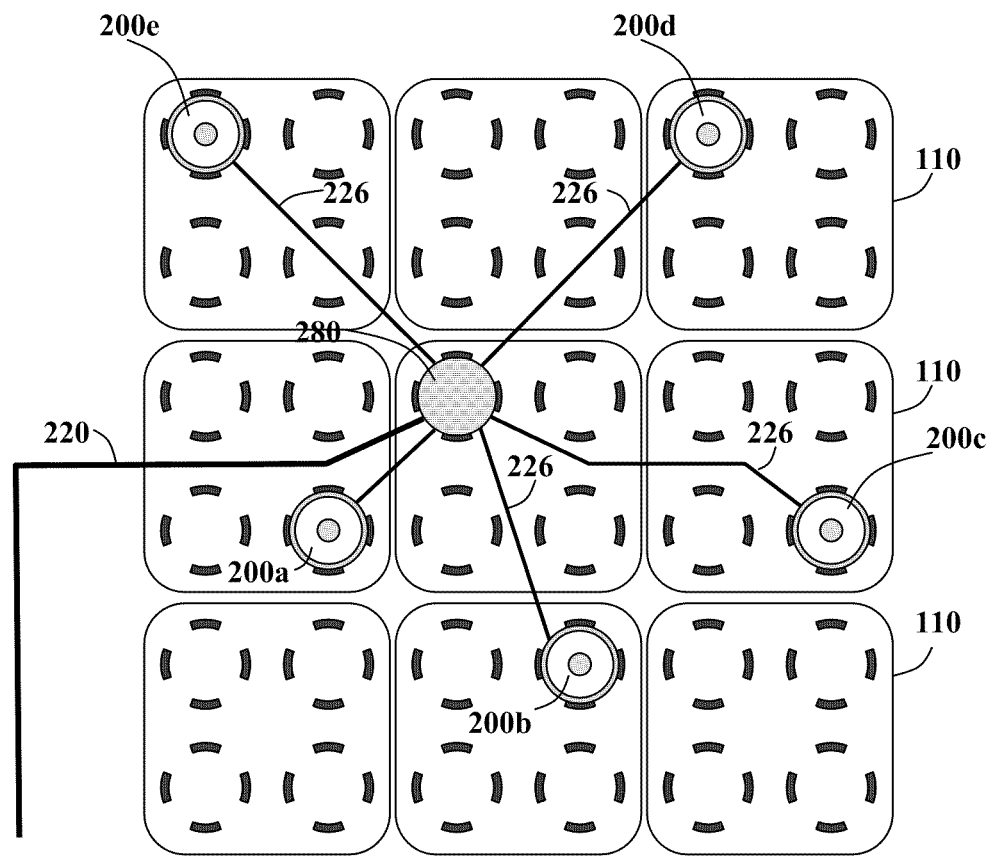

Referring to FIG. 8a, an alternative hub-control configuration of the primary inductor units 200a-e is shown. The primary inductor units 200a-e are controlled centrally from a single control hub 280 which is wired to the power source. Each primary coil 201a-e is conductively connected directly to the control hub 280 via power lines 220. The control hub 280 is thus able to directly and individually connect each primary coil 201a-e to the power source. FIG. 8b shows how the hub-control configuration may be incorporated into the power platform and FIG. 8c shows the hub-control configuration incorporated into a modular platform.

It will be appreciated that electronic driving circuitry is necessary to drive the primary coils 201 such as, for example a high frequency voltage oscillator. Driving electronics may be provided by the controller 260 alongside a selector for selecting which primary coil 201 is to be driven. Alternatively, the driving electronics may be incorporated within the switching units 270 of the individual primary inductor units 200 and the controller 260 may serve to select the primary inductor unit(s) 200 to be activated.

Figure 9A:
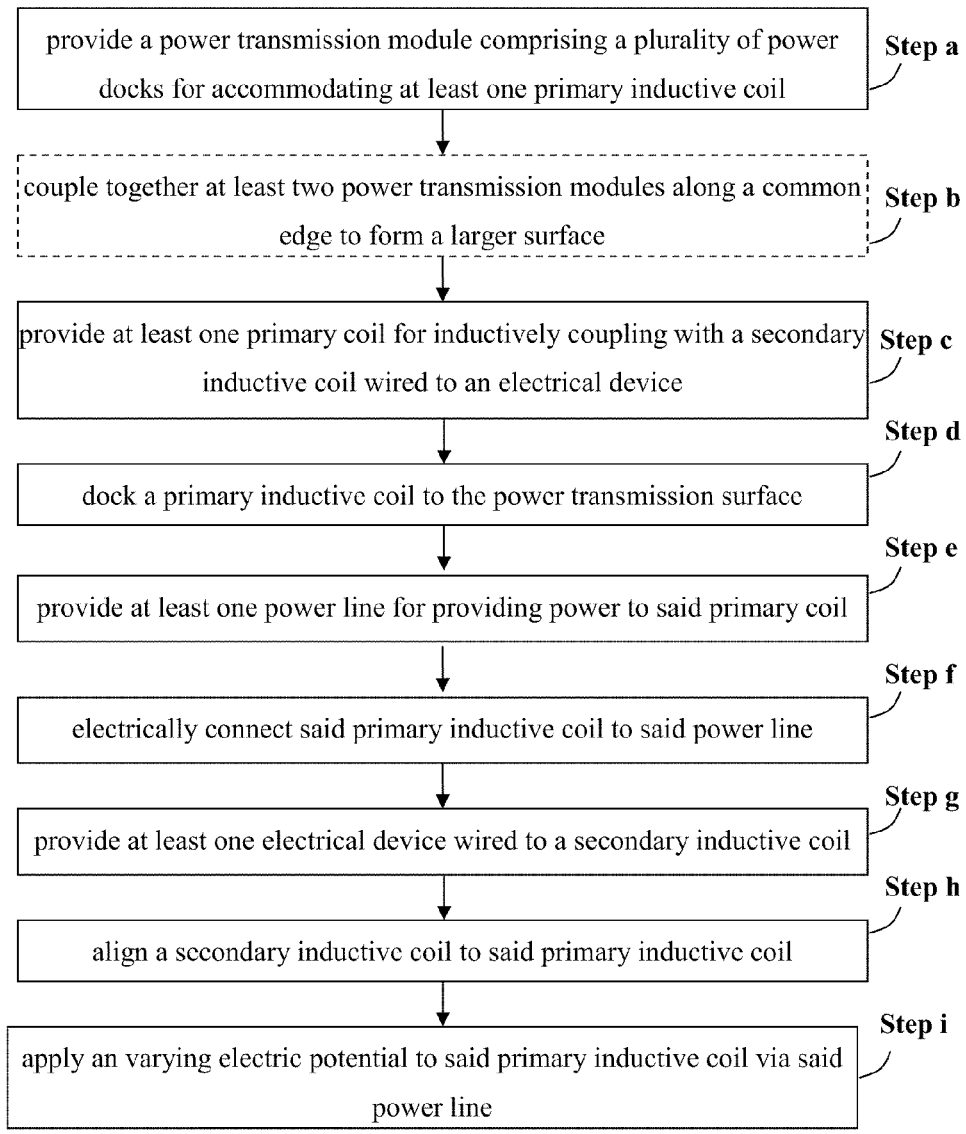
FIGS. 9a and 9b are flowcharts outlining methods for providing power to electrical devices using power transmission platforms of embodiments of the present disclosure.

With further reference to the flowchart of FIG. 9a, a method for wirelessly providing power using the power transmission platform 100 described above is presented. Power transmission modules 110 comprising at least one power dock 120 are provided (step a). Optionally, at least two power transmission modules 110 are coupled together along a common edge to form a larger surface (step b). Primary inductor units 200 are provided for inductively coupling with secondary inductive coils wired to electrical devices (step c). At least one primary inductor unit 200 is incorporated within the power transmission surface (step d). Power lines 220 are provided for providing power to the primary coil units (step e) and the primary inductor units 200 are electrically connected therewith (step f). An electrical device wired to a secondary inductor is provided (step g) and the secondary inductor is aligned to one of the primary inductor units 200 (step h). A varying electric potential is applied to the primary inductive coil 201 via the power line 222 (step i) and the secondary inductive coil 322 inductively receives power transmitted by the primary inductive coil 201 thereby providing power to an electrical load coupled therewith.

Figure 9B:
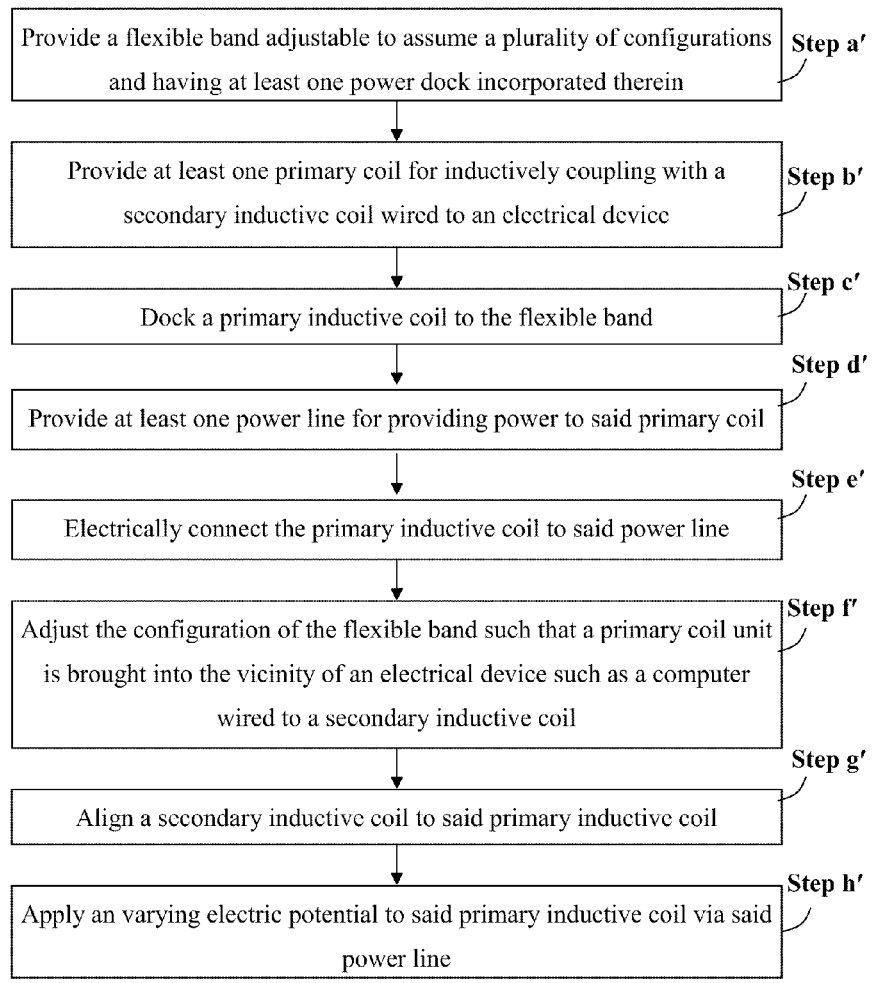

With further reference to the flowchart of FIG. 9b, a second method for wirelessly providing power using the flexible power strip 102 described above is presented. An adjustable flexible band 130 is provided which may assume a plurality of configurations and which has at least one power dock 120 incorporated therein (step a'). Primary inductor units 200 are provided for inductively coupling with secondary inductive coils wired to electrical devices (step b'). At least one primary coil unit 200 is docked to the flexible band (step c'). Power lines 220 are provided for providing power to the primary inductor units (step d') and the primary inductor units 200 are electrically connected therewith (step e'). The configuration of the flexible band 130 is adjusted such that a primary inductor unit 200 is brought into the vicinity of an electrical device such as a computer 520 wired to a secondary inductive coil (step f). The secondary inductive coil is aligned to one of the primary inductor unit 200 of the strip 102 (step g'). A varying electric potential is applied to the primary inductive coil 201 via the power line 222 (step h') and the secondary inductive coil 322 inductively receives power transmitted by the primary inductive coil 201 thereby providing power to the electrical device 320.

Referring back to the switching units 270, used to control the primary inductors 201, it is noted that power switches are an important safety component in any power outlets since they may serve to cut off the power outlet from its power source. This is particularly important in inductive power outlets which do not typically require conductive contact to transmit power. In inductive power outlets, the power switches may be necessary to prevent power leakages.

U.S. Pat. No. 6,803,744, to Sabo, titled "Alignment independent and self aligning inductive power transfer system" describes an inductive power transfer device for recharging cordless appliances. Sabo's device includes a plurality of inductors which each serve as the primary coil of a transformer. The secondary coil of the transformer is arranged within the appliance. When the appliance is positioned proximate to the power transfer device with the primary and secondary coils in alignment, power is inductively transferred from the device to the appliance via the transformer.

The inductors of Sabo's system are arranged in an array and connected to a power supply via power switches, embedded in the power transfer device. The power switches are selectively operable to activate associated inductors. The power switches conserve power and prevent the transmission of electromagnetic fields from the inductors of the power transfer system. Such power switches are switched each time an inductor is activated and deactivated and consequently deteriorate relatively quickly. Moreover, because the switches are embedded within the power transfer device, they are not easily replaceable.

Figure 10:
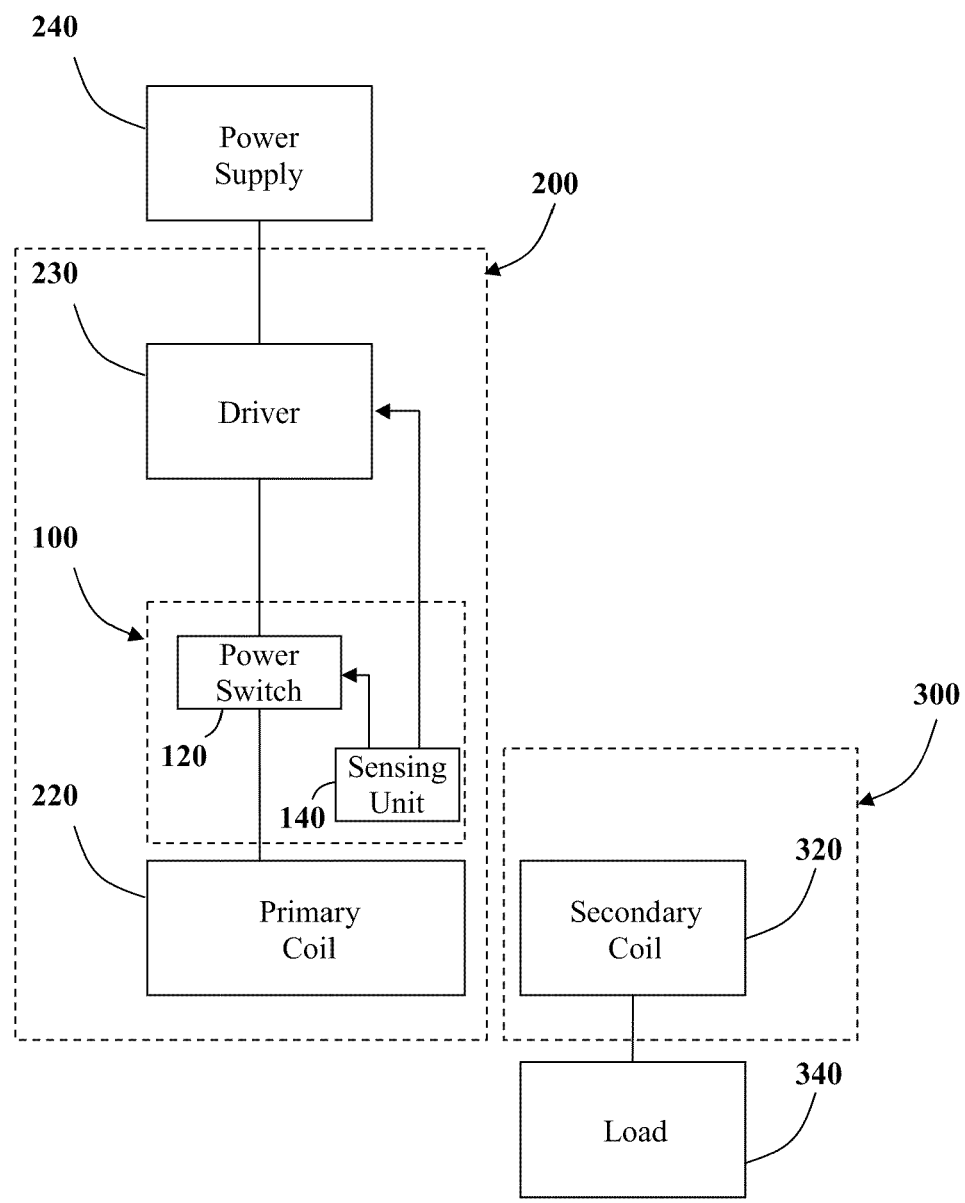
FIG. 10 is a block diagram showing the main features of a switching system for controlling an inductive power outlet.

Reference is now made to FIG. 10 showing a block diagram of the main features of a switching system 10 for controlling a primary inductive unit 20 according to various embodiments of the present disclosure.

The primary inductive unit 20 consists of a primary inductor 22, wired to a power supply 24, for inductively coupling with a secondary inductor 32, housed in a secondary unit 30, wired to an electric load 34.

The primary coil 22 is wired to the power supply 24 via a driver 23 which provides the electronics necessary to drive the primary coil 22. Driving electronics provides a high frequency oscillating voltage supply. Where the power outlet 20 consists of more than one primary coil 22, the driver 23 may additionally consist of a selector for selecting which primary coil 22 is to be driven.

The power outlet 20 is controlled by a switching system 10 consisting of a power switch 12, for connecting the primary coil 22 to the driver 23, and a sensing unit 14 in communication with the switch 12 and the driver 23, for detecting a secondary coil 32 in proximity to the primary coil 22. When the sensing unit 14 detects that a secondary coil 32 is within range of the primary coil 22, the power switch 12 is closed.

Opening a closed switch while current is flowing may cause arcing, with a spark formed across the gap. Such arcing or sparking is problematic as it can lead to deterioration or failure of the switch.

Sparking occurs when the voltage drop between the contacts is large and the gap between the contacts is small enough that the voltage discharges across the gap. These conditions typically occur when a power switch is opened while current is passing through it. Sparking may corrode the contacts by the formation of an insulating oxide layer which prevents the contacts from forming a conductive bridge even when they are in contact with one another. Moreover, the effective contact area may be decreased due to erosion which increases the resistance and causes overheating and possibly even fire.

The number of times a switch may be switched on and off before being replaced is limited by the build up of the non-conductive oxide layer. Thus in systems requiring frequent switching standard switches are unsuitable. In various embodiments of the present disclosure, power switch 12 is not used to disconnect the primary coil 22 from the driver 23 while the primary coil 22 is active. Rather, when the sensing unit 14 detects that the secondary coil 32 has been moved out of range of the primary coil 22, the driver 23 is deactivated before the power switch 12 is opened. Thus, the current stops flowing through the power switch 12 before the power switch 12 is opened. This prevents sparking between the contacts (not shown) of the power switch 12.

Figure 11A:
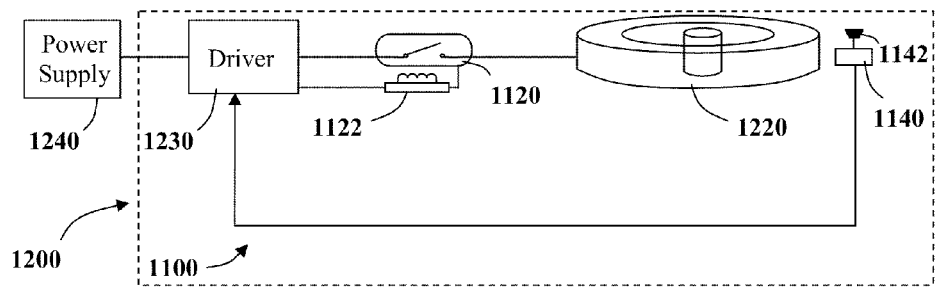
FIG. 11a-c are schematic diagrams of an inductive power outlet incorporating a protected switch according to one embodiment of the disclosure.
Figure 11B:
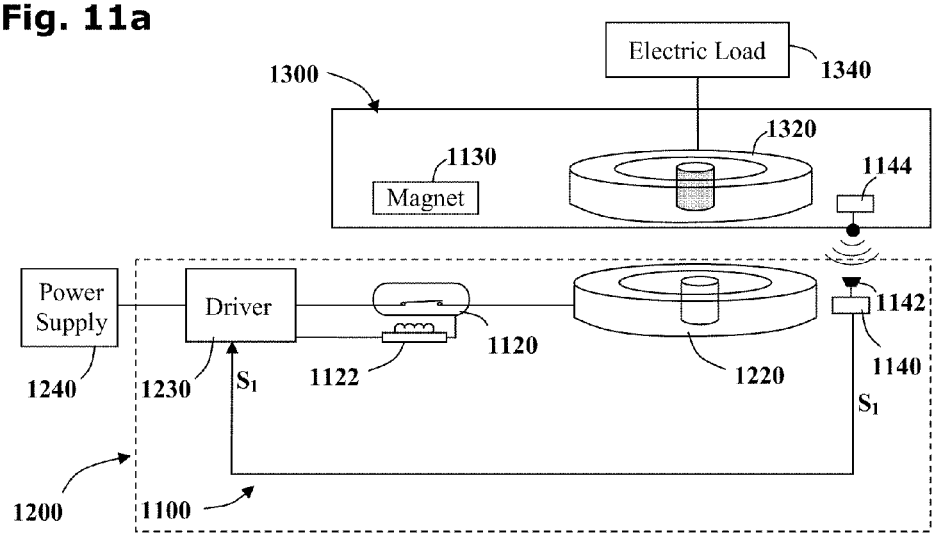
Figure 11C:
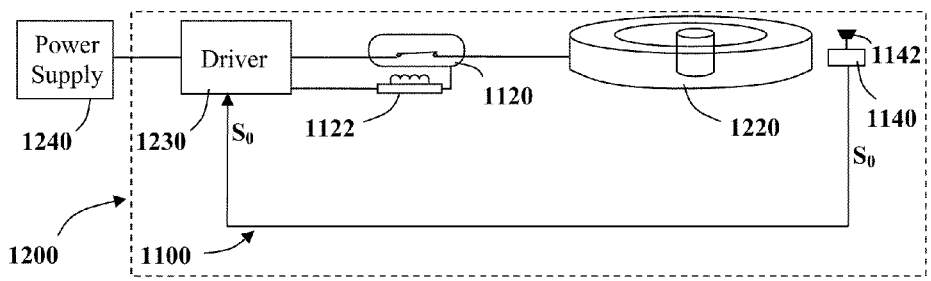

A schematic diagram of an exemplary switching system 1100 for controlling an inductive power outlet 1200 is shown in FIGS. 11a-c according to another embodiment of the disclosure. The switching system 1100 consists of a reed switch 1120, a solenoid 1122 and a secondary sensing unit 1140. The reed switch 1120 is configured to close when a magnet 1130 is brought into proximity therewith, the solenoid 1122 is configured to produce a magnetic field of sufficient magnitude to keep the reed switch 1120 closed and the secondary sensing unit 1140 is configured to detect the presence of a secondary coil 1320.

When closed, the reed switch 1120 connects a primary coil 1220 to a driver 1230 which is wired to a power supply 1240. Additionally, the reed switch 1120 also connects the power supply 1240 to the solenoid 1122. The solenoid 1122 thus produces a magnetic field which keeps the reed switch 1120 closed. In this way, once the reed switch 1120 has been closed by the magnet 1130, the magnet 1130 can be removed without the reed switch 1120 opening.

The reed switch 1120 is protected from sparking because its contacts are held together by the magnetic field of the solenoid 1122 for as long as current flows therethrough. Although a reed switch is described hereabove, it is noted that in other embodiments of the disclosure, other magnetically sensitive switches such as Hall switches or the like may be used.

The secondary sensing unit 1140 is configured to detect when a secondary coil 1320 is inductively coupled to the primary coil 1220. When a secondary coil 1320 is detected, an activation signal $S_1$ is sent to the driver 1230, which then drives the primary coil 1220. When the secondary coil 1320 is removed, the secondary sensing unit 1140 sends a deactivation signal $S_0$ to the driver 1230, which then stops driving the primary coil 1220.

The secondary sensing unit 1140 may include, for example, an optical receiver 1142 associated with the primary coil 1220 which is configured to receive a detection signal from an optical emitter 1144 associated with the secondary coil 1320.

Alternatively or additionally, the secondary sensing unit 1140 may be configured to receive a detection signal such as some standard data signal of a type widely used in computing and telecommunications, for example an Infra-red, Wi-fi or Bluetooth signal or the like. Indeed, any light emitting diodes, radio transmitters, optocouplers, ultrasonic transducers or other such emitters may be used.

According to another embodiment of the disclosure (not shown) a reception circuit may be incorporated within the driver for monitoring the power drawn from the primary coil. This reception circuit may be configured to deactivate the driver when no load is detected. Optionally, a corresponding transmission circuit, comprising an ancillary load connected to the secondary coil via a switching unit in parallel to the main electrical load, may be used to modulate the power received by the secondary coil so that data may be transferred to the reception circuit.

FIG. 11a shows the inductive power outlet 1200 in its inactive configuration with no secondary coil 1320 coupled thereto. In this configuration, the reed switch 1120 is open and the primary coil 1220 is disconnected from the driver.

In FIG. 11b a secondary unit 1300 is shown aligned to the inductive power outlet 1200. The secondary unit 1300 comprises a secondary coil 1320, wired to an electric load 1340, a magnet 1130, configured to close the reed switch 1120 and an optical emitter 1144. When the secondary unit 1300 is positioned relative to the inductive power outlet 1200 such that the secondary coil 1320 is aligned with the primary coil 1220, the magnet 1320 closes the reed switch 1120 connecting the driver 1230 to the primary coil 1220. Moreover, the detector 1142 receives a detection signal from the emitter 1144 thereby activating the driver 1230. Consequently, the primary coil 1220 transfers energy inductively to the secondary coil 1320.

With reference to FIG. 11c, the inductive power outlet 1200 is shown during the short time interval between the secondary unit 1300 being removed and the driver 1230 being deactivated. With the secondary unit 1300 removed, the magnet 1130 is no longer close enough to the reed switch 1120 to keep the reed switch 1120 closed (otherwise it is the magnet). However, the protective solenoid 1122 is still connected to the active driver 1130 and therefore, itself provides a magnetic field of sufficient strength to keep the reed switch 1120 closed. The detector 1142 no longer receives the detection signal from the emitter 1144 so a deactivation signal is passed to the driver 1230 which stops driving the primary coil 1220. The driver 1230 stops providing power to the primary coil 1220, the protective solenoid 1122 is disconnected and the reed switch 1120 opens. The inductive power outlet 1200 therefore adopts its inactive configuration as shown in FIG. 2a. It is noted that, because the driver 1230 is deactivated before the reed switch 1120 opens, sparking is avoided since current stops flowing through the reed switch 1120 prior to being unplugged.

Figure 12:
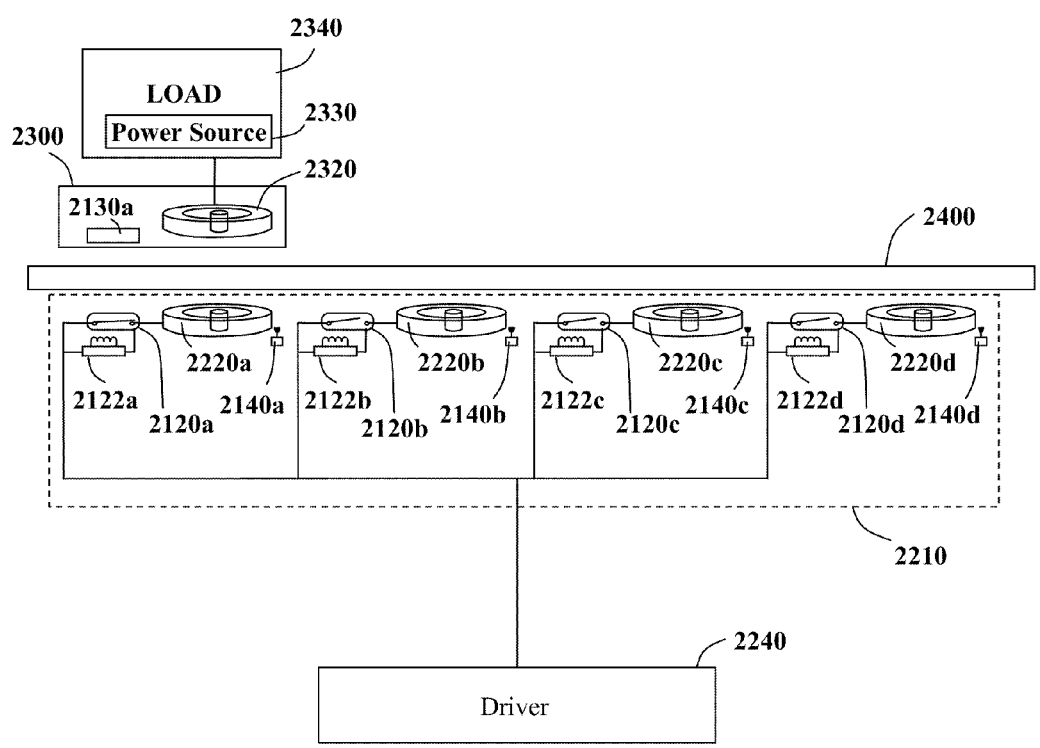
FIG. 12 shows a multicoil inductive power outlet incorporating a cluster of primary coils each connected to a single driver via protected switches according to another embodiment of the disclosure.

Reference is now made to FIG. 12 which shows a schematic diagram of a multicoil inductive power outlet 2200 controlled by protected power switches 2120 according to a further embodiment of the disclosure. The multicoil inductive power outlet 2200 includes a cluster 2210 of primary inductive coils 2220a-d. All of the primary inductive coils 2220a-d are connected to a single driver 2230 via separate power switches 2120a-d each protected by a solenoid 2122a-d. The multicoil inductive power outlet may, for example, be incorporated into a flat surface 2400, such as a desk top, to provide power inductively to electrical devices placed upon the surface 2400.

A secondary unit 2300 is configured to receive power from the inductive power outlet 2200. The secondary unit 2300 consists of a secondary coil 2320 wired to an electrical load 2340 and a triggering mechanism 2130, such as a magnet for closing a reed switch. Secondary units 2300 may be inductive power receivers, integral or retrofitted to electrical devices such as computers, televisions and the like.

The secondary unit 2300 is located such that its triggering magnet 2130 closes the protected power switch 2120a thereby connecting the associated primary inductive coil 2220a to the driver 2230. A secondary detector 2140a is configured to send an activation signal to the driver 2230 indicating that the secondary inductive coil 2320 is coupled to the primary inductive coil 2220a.

When the driver 2230 receives the activation signal, an oscillating voltage is provided to the cluster 2210. Although the driver 2230 provides the oscillating voltage to the whole cluster 2210, only one of the power switches 2120a is closed. Therefore only the primary inductive coil 2220a associated with the closed power switch 2120a is activated. All other primary coils 2220b-d remain inactive.

Although the secondary unit 2300 is shown drawing power from one primary inductive coil 2220a, it will be appreciated that the secondary unit 2300 may be alternatively aligned with any other primary inductive coil 2220b-d.

When the secondary unit 2300 is moved away from a primary inductive coil 2220a, the trigger magnet 2130 is removed from the associated power switch 2120a but the switch 2120a remains closed. The secondary detector 2140a detects that the secondary coil 2320 is no longer coupled to the primary coil 2220a and sends a deactivation signal to the driver 2230. The driver 2230 stops providing the oscillating voltage and the power switch 2120a opens without sparking The secondary unit 2300 may then be brought into alignment with another primary inductive coil 2220b. The associated power switch 2120b is closed by the triggering magnet 2130 and the secondary detector 2140b sends an activation signal to the driver 2230. It is noted that two or more primary inductive coils 2220 may be controlled by a common secondary detector 2140.

In various embodiments, the secondary unit 2300 additionally includes an internal power source 2330, such as a voltaic cell, capacitor or the like, for providing power to the load 2340 during transition between the primary inductive coils 2220. In this way the secondary unit 2300 may be moved between the primary inductive coils 2220 without a user noticing the transition.

It is a particular feature of this embodiment of the disclosure that since only one driver 2230 is needed to control the whole multicoil cluster 2210, the system requires minimal maintenance. Consequently, the power switches 2120 and primary coils 2220 may be embedded into surfaces 2400, such as desktops, flat electrical appliances, walls, floors and so on. The central driver 2230, which is a more costly component, may usefully be housed in a remote unit where it may be more easily accessed. This represents an advantage over prior art inductive power systems where each primary coil typically requires a separate driver or a specialized power switch.

A large coil cluster 2210 with a high coil density may be incorporated with a single driver 2230 into a surface 2400. Thus, power may be provided to a secondary unit 2300 placed anywhere on the surface 2400 and even when the secondary unit 2300 is moved across the surface 2400. Despite power being directed to single units in turn, the user experience of such a surface 2400 is that the whole surface 2400 is power enabled.

FIG. 13 is a flowchart illustrating a method for providing a low maintenance inductive power transmission said method comprising the following steps: embedding, in a surface, a cluster comprising a plurality of primary inductive coils each connected to a power switch, the power switch being configured to remain closed for as long as electric current passes therethrough—step (alpha); connecting all power switches to a common driver, the driver for providing an oscillating voltage to the cluster only if it receives an activation signal—step (beta); providing a inductive power receiver comprising a secondary inductive coil wired to an electric load and at least one trigger configured to close at least one power switch when the secondary inductive coil is aligned with the primary inductive coil associated therewith—step (gamma); and providing a secondary detector configured to send said activation signal to said driver when it detects a secondary inductive coil coupled to said primary inductive coil—step (delta).

Figure 14:
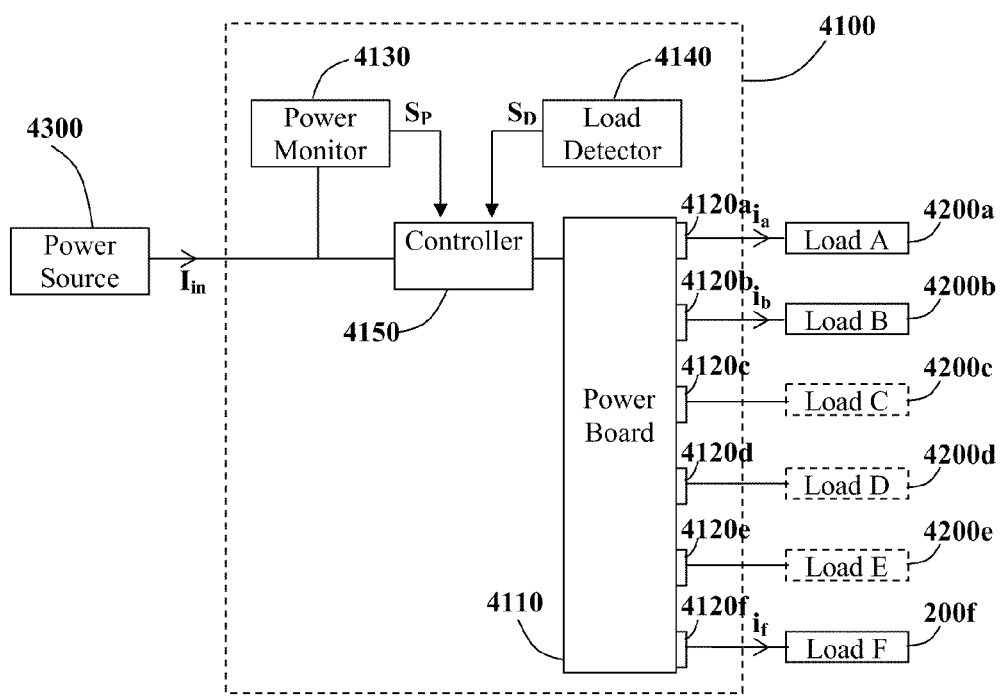
FIG. 14 is a block diagram of an energy management system for controlling power distribution in a multi-coil power platform.

According to further embodiments of the disclosure, the power distribution to the inductors of a multi-coil inductive outlet may be controlled by an energy management system. Referring now to FIG. 14 an exemplary energy management system 4100 is shown coupled to a power source 4300 and connected to a plurality of loads 4200a-f. The power source 4300 is electrically coupled to a power board 4110 via a controller 4150. The controller 4150 is configured to receive a power signal Sp from a power monitor 4130 and a load signal $S_L$ from a load monitor 4140. The power board 4300 includes a plurality of electrical power jacks 4120a-f which may be coupled to a plurality of electrical loads 4200a-f.

When a load 4200 is coupled to a jack 4120, the load 4200 is detected by the load detector 4140. The load signal $S_L$ relays this information to the controller 4150. For example, in FIG. 14 only three loads 4200a, 4200b and 4200f are connected to power jacks 4120. As a result the controller 4150 provides power to the active jacks 4120a, 4120b and 4120f which are connected to those loads 4200a, 4200b and 4200f but not to the inactive jacks 4200c, 4200d and 4200e to which no loads are connected. If an additional load 4200c is connected to an inactive jack 120c then this load 200c is detected by the load detector 4140 which sends a signal to the controller 4150. The controller 4150 then activates the inactive jack 4120c thereby providing power to the new load 4200c.

Although various modes by which a load detector 4140 may locate loads 4200 may be known to the man of the art, a selection of possible methods includes:

- external sensors such as volume sensors, infra-red sensors, ultrasonic sensors, hall probes or the like, perhaps using simple triangulation to locate the load 4200;
- connecting load 4200 to a jack 4120 to close a detection circuit for example by pushing down a spring switch that is conductively connecting two contacts or the like.
- magnetic switches in the power board 4110 that may detect the presence of a magnet embedded in the load 4200, possibly using a magnetic key to identify the load;
- transmitters 4290 (FIG. 17) embedded in the load 4200 transmitting signals such as for example infra-red signals, radio signals or the like to a receiver 4190 (FIG. 4) in the load detector 4140;
- primary inductive coils in the power board 4110 which may be used to locate a secondary inductive coil in a load 4200 by scanning at low power and detecting additional power drawn by a load 4200.

In addition, the controller 4150 is configured to regulate the power delivered to the power jacks 4120a-f. The power monitor 4130 monitors the power delivered to the power board 4110 and relays this information to the controller in the power signal $S_P$. The controller 4150 is preconfigured to provide power to the power jacks 4120 in a manner at least partially determined by the power signal $S_P$. Power may be provided to more than one power jack 4120 in a number of ways, such as simultaneously, sequentially or intermittently, for example.

An exemplary energy management system may be used to regulate the current $I_{in}$ being drawn by the power board 4100 from the power source 4300. The controller 4150 may be preconfigured to limit the current drawn $I_{in}$ from the power source 4300 such that it will not exceed a maximum value. The current drawn by the power board $I_{in}$ depends upon the current $i_{a-f}$ drawn by all connected loads 4200. When the connected loads 4200a, 400b and 4200f draw too much current $i_a$, $i_b$ and $i_f$ the current drawn $I_{in}$ from the power source 4300 may exceed its maximum value. In such a scenario, the controller 4150 may be preconfigured to sequentially switch between the active power jacks 4120a, 4120b and 4120f according to a predetermined duty cycle. Thus the total current drawn by the connected loads 4200a, 4200b and 4200f is limited thereby, maintaining the current $I_{in}$ drawn by the power board at a level below its maximum value.

Figure 15:
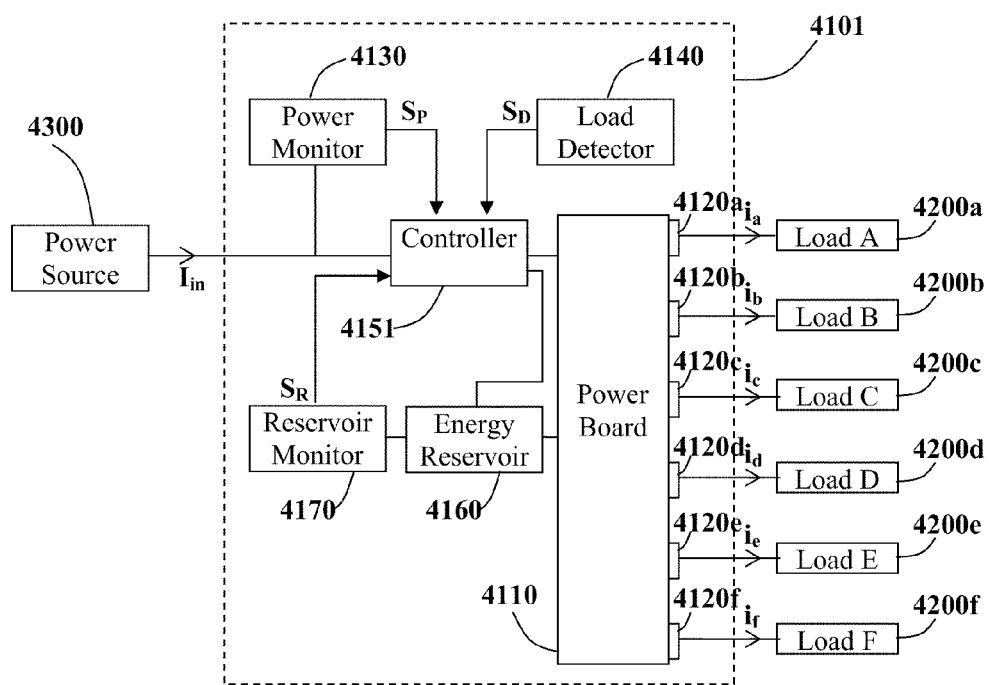
FIG. 15 is a block diagram of a second embodiment of the energy management system having an energy reservoir for storing energy.

Reference is now made to FIG. 15 showing a second embodiment of the energy management system 4101 having an energy reservoir 4160 such as a voltaic cell, a capacitor, a fuel cell, a super-capacitor, a flow battery, a superconducting magnetic energy store or the like. A reservoir monitor 4170 is configured to monitor the energy level of the energy reservoir 4160 and relay this information to the controller 4151 in reservoir signal $S_R$.

In the second embodiment of the energy management system 4101, the controller 4151 is preconfigured to selectively charge up the energy reservoir 4160, for example when the power signal Sp indicates that the power being drawn from the power source 4300 is low. This function may be used to provide a lower limit upon the drawn current $I_{in}$.

Furthermore, as outlined above, when the drawn current $I_{in}$ exceeds its upper limit, active power jacks 4120 are intermittently connected to the power source 4300 according to a duty cycle. In the second embodiment of the energy management system 4101, the energy reservoir 4160, once it has been charged, may be used to provide power to active power jacks 4120 for the duration of the cycle when they are disconnected from the power source 4300. Thus uninterrupted power is provided to all the loads 4200a-f continuously.

It will be appreciated that by limiting the operating parameters of the energy management system 4101 to fall within a specific range, the efficiency of the system 4101 may be optimized to minimize the power lost when operating within this precisely known range. Thus the energy management system 4101 may significantly reduce energy losses particularly when operating over long periods of time.

Figure 16:
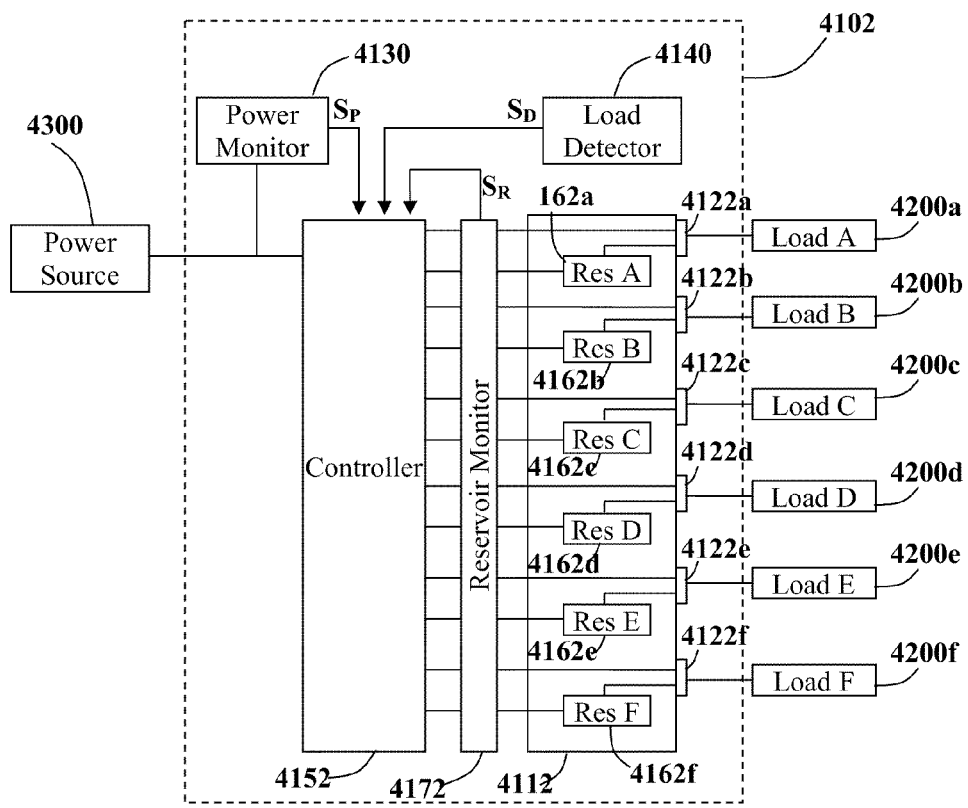
FIG. 16 is a block diagram of a third embodiment of the energy management system having individual energy reservoirs for each power jack.

In FIG. 16 a third embodiment of the energy management system 4102 is shown wherein each of the power jacks 4122a-f has an individually coupled energy reservoir 4162a-f which are all monitored by a reservoir monitor 4172. The controller 4152 may control each jack 4122 and may switch between charging the reservoir 4162, supplying power directly to the jack 4122 or both simultaneously.

Figure 17:
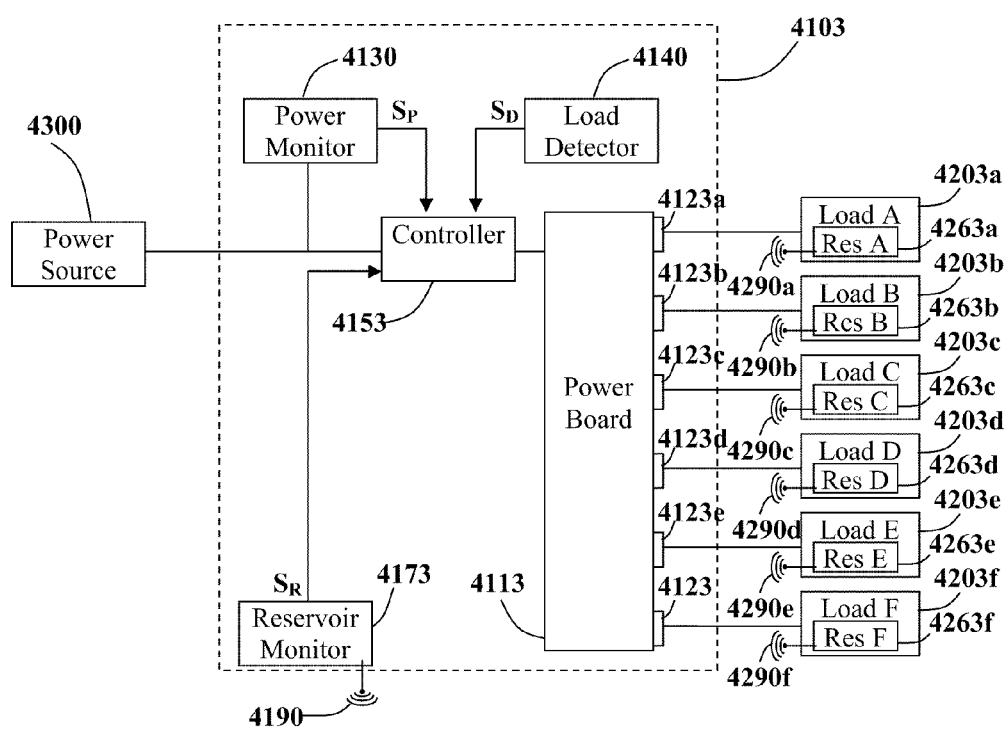
FIG. 17 is a block diagram of a fourth embodiment of the energy management system connected to loads having onboard energy reservoirs.

Referring now to FIG. 17 a fourth embodiment of the energy management system 103 is shown. Here each load 4203a-f carries its own energy reservoir 4263. Transmitters 4290a-f in communication with the loads transmit signals to a receiver 4190 in communication with the reservoir monitor 4173 thereby providing data regarding the power level of energy reservoirs 4263.

When the controller 4153 connects a power jack 4123a-f to the power source 4300, the coupled load 4203a-f automatically charges the energy reservoir 4263a-f and directly powers the load 4203a-f simultaneously. When the controller 4153 disconnects a power jack 4123a-f, the coupled load 4203a-f automatically draws power from its own energy reservoir 4263a-f. The controller 4153 receiving the reservoir signal $S_R$ may thus be configured to provide power intermittently to each load 4203a-f such that the power level of each reservoir 4263a-f is maintained. In this manner each load 4200 is able to operate continuously and the power drawn from the power source 4300 is minimized.

Figure 18:
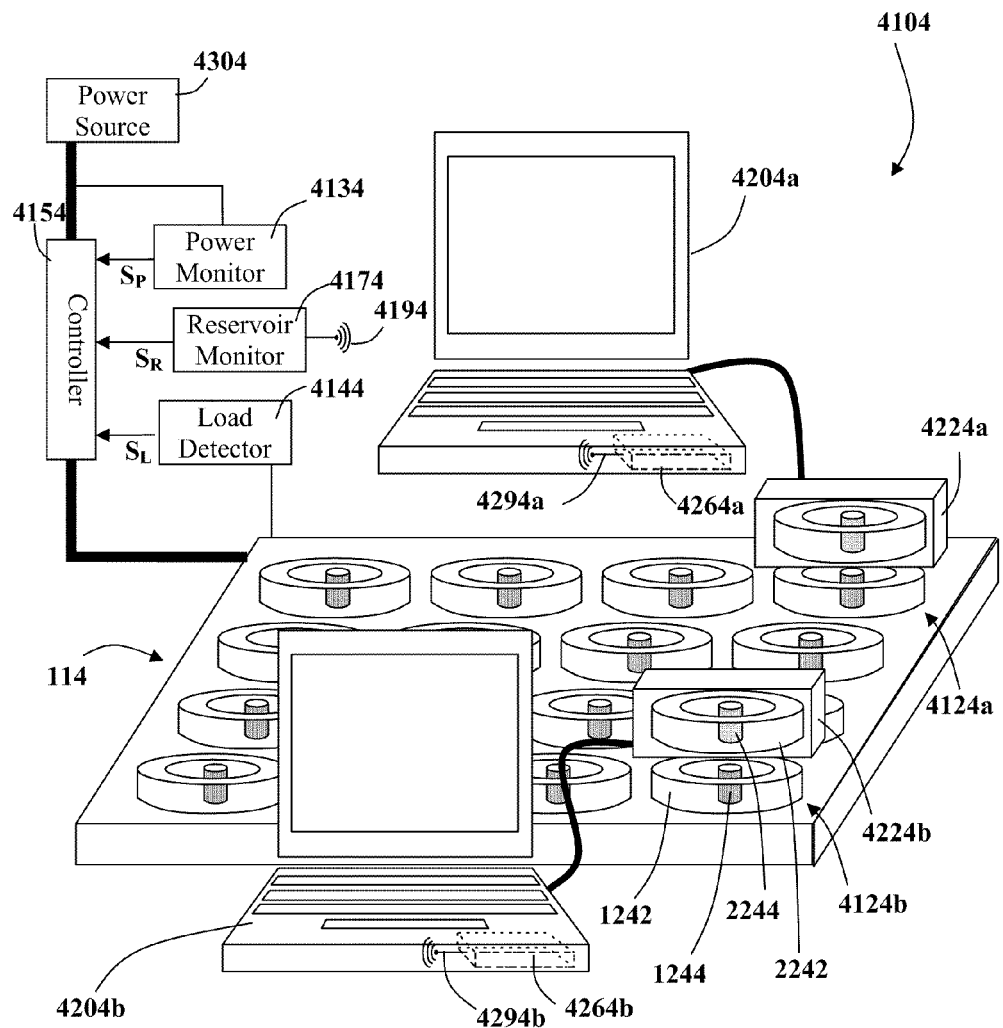
FIG. 18 is a schematic representation of another embodiment of the energy management system used to power two computers having onboard power cells.
Figure 19:
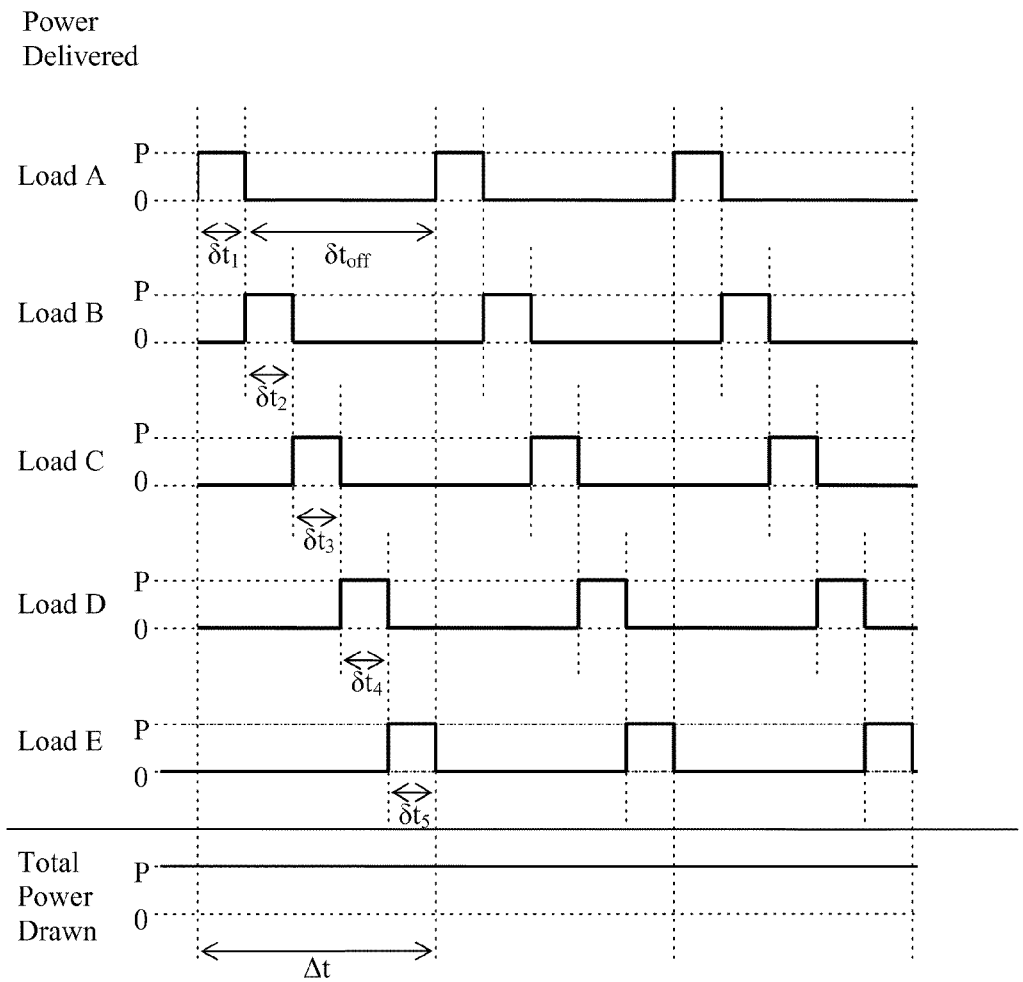
FIG. 19 shows typical duty cycles for sharing power between five loads.

One embodiment of the energy management system 4105 is shown in FIG. 18. With reference to FIG. 18, a power board 4114 comprises an array of inductive power jacks 4124, each inductive power jack 4124 has a primary inductive coil 1242 and a magnetic switch 1244. Two computers 4204a, 4204b having onboard power cells 4264a, 4264b are coupled to the power board 4114 via inductive power plugs 4224a, 4224b. Each of the inductive power plugs 4224a, 4224b includes a secondary inductive coil 2242 and a magnet 2244. A power monitor 4134, load detector 4144 and reservoir monitor 4174 provide control signals for a controller 4154 which regulates the power drawn from a power source 4304 and delivered to the power jacks 4124.

When an inductive power plug 4224a, 4224b is brought into proximity with an inductive power jack 4114a, 4114b the magnet 2244 triggers the magnetic switch 1244. This sends a signal to the load detector 4144 which is relayed to the controller such that the associated inductive power jack 4114a, 4114b is activated. Radio transmitters 4294a, 4294b transmit the power level of the onboard cells 4264a, 4264b to a receiver 4194 in communication with the reservoir monitor 4174. The controller can thereby monitor the level of the onboard cells 4264 of connected computers 4204 and selectively connect and disconnect the power jacks 4114a, 4114b thereby ensuring that the power drawn from the power source 4304 is minimized.

It is further noted that if the transmitters 4294 are configured to be in close proximity to the receivers 4194, they may be used to provide data-transfer at low power. By using low power Wi-fi or Bluetooth signals, for example, the power demanded by these applications may be minimized.

Typical duty cycles for providing power to five loads are shown in FIG. 6. A constant power level P is drawn throughout the duty cycle. However, this power is delivered sequentially to each of the five loads. Load A receives power P for a short time interval $\delta t_1$ and is then disconnected for a longer interval $\delta t_{off}$. Once Load A is disconnected Load B is connected for a time interval $\delta t_2$ and then switched off. All loads are connected sequentially over the time period $\Delta t$ of the duty cycle and then the cycle is repeated. Typically all loads are connected for equal time intervals $\delta t_{1-5}$, however it will be appreciated that unequal time intervals may be accommodated.

Thus, according to various embodiments of the current disclosure, an adjustable platform is provided for providing movable inductive outlets. In one embodiment, a user is able to position the inductive outlets as required. Optionally, the inductive outlets may be controllable separately allowing power to be provided by induction to a plurality of electrical loads. In further embodiments of the disclosure, the power distribution to such loads is controlled centrally allowing energy to be conserved.

The scope of the present disclosure is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. An inductive power transmission platform comprising:
   at least one cluster of primary inductors configured to couple with at least one secondary inductor wired to an electrical load; and
   a common driver connected to each primary inductor of said cluster via an individual power switch, said driver for providing an oscillating voltage to at least one of said cluster of primary inductors;
   wherein said power switch is operable to disconnect said primary inductor from said common driver only after said driver is deactivated, such that no current passes through said switch prior to said switch being opened.

2. The platform of claim 1 wherein each said power switch comprises a magnetic switch.

3. The platform of claim 2 further comprising a solenoid for providing a magnetic field in the vicinity of said magnetic switch when said magnetic switch is closed.

4. The platform of claim 2 additionally comprising a secondary sensing unit, in communication with said driver, for detecting said secondary inductor coupled to said primary inductor.

5. The platform of claim 4 said driver providing said oscillating voltage only on reception of an activation signal from the sensing unit.

6. The platform of claim 4 wherein said sensing unit comprises an optical receiver for receiving an optical signal from an optical emitter associated with said secondary inductor.

7. The platform of claim 1 further comprising an energy management system for managing the power drawn from a power source, said energy management system comprising:
   at least one power monitor for monitoring the power drawn by said platform and for producing a power signal;
   at least one load detector for detecting the presence of said electric load coupled to said primary inductor and for producing a detection signal; and
   at least one controller configured to receive said power signal and said detection signal, to select at least one primary inductor to be activated and to control power delivered to said at least one primary inductor.

8. The platform of claim 7 additionally comprising at least one energy reservoir.

9. The platform of claim 8 wherein said energy reservoir is selectively couplable to at least one of a group consisting of: the power source, the electric load or the primary inductor.

10. The platform of claim 8 additionally comprising a reservoir monitor for monitoring the level of energy stored in said energy reservoir producing a reservoir signal wherein said controller receives said reservoir signal and selectively connects said energy reservoir to said power source.

11. The platform of claim 8 wherein said energy reservoir is selected from at least one of the group consisting of a voltaic cell, a capacitor, a fuel cell, a supercapacitor, a flow battery, a chargeable cell, a superconducting magnetic energy store, power cells connected to said electric load and combinations thereof.

12. The platform of claim 8, said at least one electric load being a computer having onboard rechargeable power cells and said energy reservoir being said power cells.

13. The platform of claim 7 wherein said load detector is selected from a group consisting of a volume sensor, an infra-red sensor, an ultrasonic sensor, a hall probe, a spring switch, a magnetic switch, a transmitter-receiver arrangement and inductive elements.

14. The platform of claim 7, said controller being configured to sequentially connect a plurality of said primary inductors to said power source.

15. A method for providing inductive power transmission comprising:
   obtaining an inductive power receiver comprising
   a secondary inductor wired to an electric load, said secondary inductor operable to inductively couple with a primary inductor; and at least one trigger configured to close at least one power switch associated with said primary inductor when said secondary inductor is aligned therewith, and
   obtaining at least one inductive power transmission platform comprising:
   at least one cluster of said primary inductors; a common driver operable to receive an activation signal and to provide an oscillating voltage to at least one of said primary inductors;
   at least one power switch operable to disconnect said primary inductor from said common driver only after said driver is deactivated such that no current passes through said switch prior to said switch being opened; and
   at least one secondary detector configured to send said activation signal to said driver when it detects said secondary inductor coupled to said primary inductor.

* * * * *